United States Patent [19]

Kim

[11] Patent Number: 5,737,019
[45] Date of Patent: Apr. 7, 1998

[54] METHOD AND APPARATUS FOR CHANGING RESOLUTION BY DIRECT DCT MAPPING

[75] Inventor: Hee-Yong Kim, Plainsboro, N.J.

[73] Assignee: Matsushita Electric Corporation of America, Secaucus, N.J.

[21] Appl. No.: 593,672

[22] Filed: Jan. 29, 1996

[51] Int. Cl.$^6$ ........................................ H04N 7/30
[52] U.S. Cl. .................... 348/390; 348/403; 348/405; 348/408; 382/248
[58] Field of Search .................... 348/390, 403, 348/405, 408; 382/248; H04N 7/30

[56] References Cited

U.S. PATENT DOCUMENTS

| | | | |
|---|---|---|---|
| 5,262,854 | 11/1993 | Ng | 348/420 |
| 5,635,985 | 6/1997 | Boyce | 348/402 |

OTHER PUBLICATIONS

Jill Bocye, John Henderson and Larry Pearlstein, "SDTV Receivers with HDTV Decoding Capability," ACATS Technical Subgroup Meeting, May 18, 1995, Washington, D.C., (18 pp).
H. Blair Benson, revised by Jerry Whitaker, "Television Engineering Handbood,", Copyright 1992, 1986 by McGraw-Hill, Inc., (7 pp.).

*Primary Examiner*—Howard W. Britton
*Attorney, Agent, or Firm*—Ratner & Prestia

[57] ABSTRACT

An apparatus for transforming the resolution of an image from a first image resolution to a second image resolution using operations in the spatial frequency domain. A first group of transform values which represent the image at the first image resolution are mapped to a second group of transform values which represent the image at the second image resolution in the spatial frequency domain. The apparatus includes stored pre-computed values which are the mapping coefficient values between the first group of transform values and the second group of transform values. The pre-computed values are retrieved from a memory and used to directly map the first group of transform values to the second group of transform values in the spatial frequency domain.

15 Claims, 13 Drawing Sheets

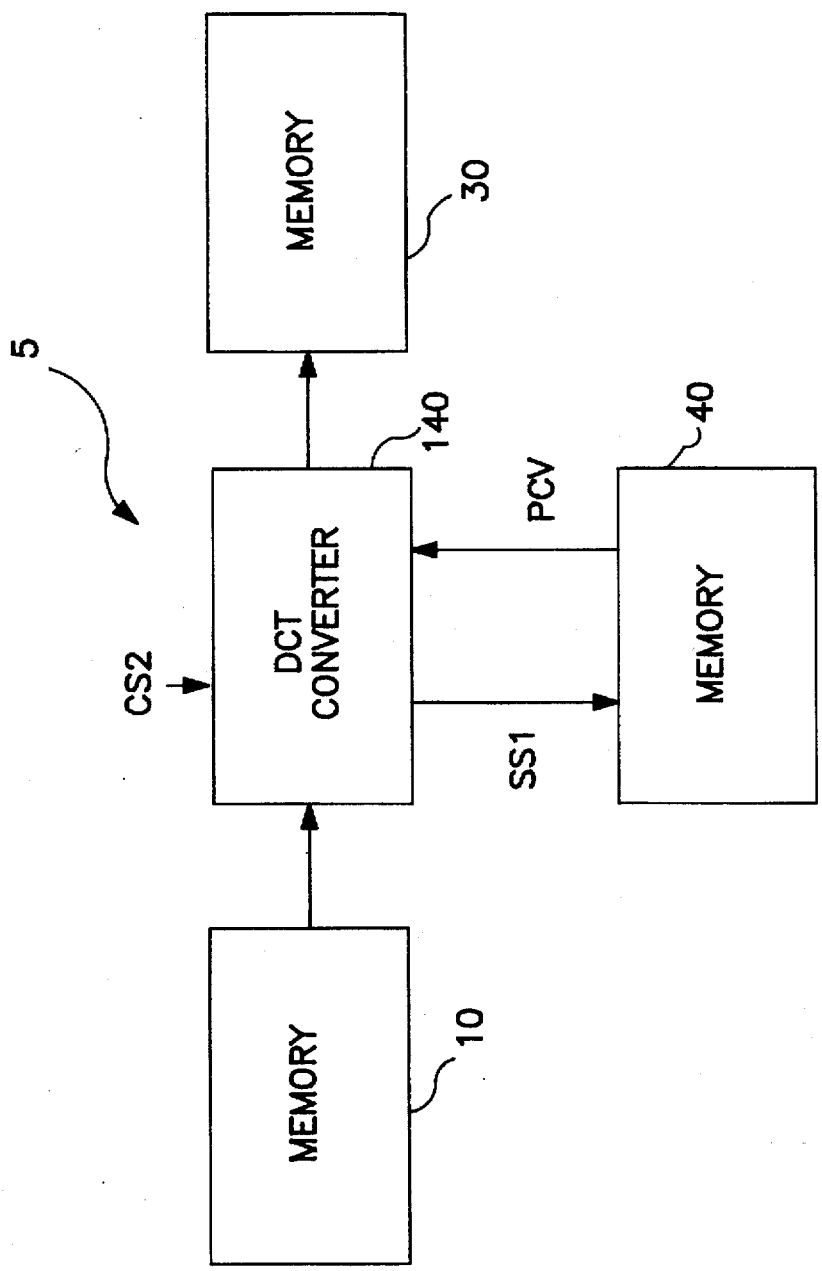

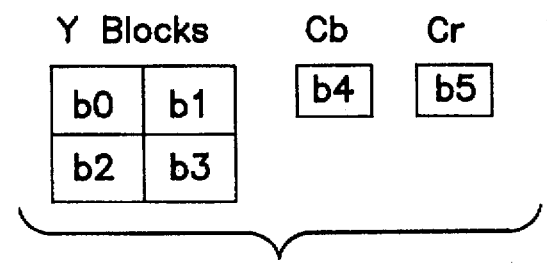
FIG. 3A
FIG. 3B
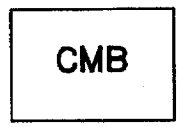
FIG. 3C

FIG. 5A

|   | μ 0 | 1 | 2 | 3 | 4 | 5 | 6 | 7 |
|---|---|---|---|---|---|---|---|---|
| 0 | 0 | 1 | 5 | 6 | 14 | 15 | 27 | 28 |
| 1 | 2 | 4 | 7 | 13 | 16 | 26 | 29 | 42 |
| 2 | 3 | 8 | 12 | 17 | 25 | 30 | 41 | 43 |
| 3 | 9 | 11 | 18 | 24 | 31 | 40 | 44 | 53 |
| 4 | 10 | 19 | 23 | 32 | 39 | 45 | 52 | 54 |
| 5 | 20 | 22 | 33 | 38 | 46 | 51 | 55 | 60 |
| 6 | 21 | 34 | 37 | 47 | 50 | 56 | 59 | 61 |
| ν 7 | 35 | 36 | 48 | 49 | 57 | 58 | 62 | 63 |

PATTERN 0

FIG. 5B

|   | μ 0 | 1 | 2 | 3 | 4 | 5 | 6 | 7 |
|---|---|---|---|---|---|---|---|---|
| 0 | 0 | 4 | 6 | 20 | 22 | 36 | 38 | 52 |
| 1 | 1 | 5 | 7 | 21 | 23 | 37 | 39 | 53 |
| 2 | 2 | 8 | 19 | 24 | 34 | 40 | 50 | 54 |
| 3 | 3 | 9 | 18 | 25 | 35 | 41 | 51 | 55 |
| 4 | 10 | 17 | 26 | 30 | 42 | 46 | 56 | 60 |
| 5 | 11 | 16 | 27 | 31 | 43 | 47 | 57 | 61 |
| 6 | 12 | 15 | 28 | 32 | 44 | 48 | 58 | 62 |
| ν 7 | 13 | 14 | 29 | 33 | 45 | 49 | 59 | 63 |

PATTERN 1

FIG. 5C

|   | 0 | 1 | 2 | 3 | 4 | 5 | 6 | 7 |
|---|---|---|---|---|---|---|---|---|
| 0 | 0 | 1 | 2 | 3 | 4 | 5 | 6 | 7 |
| 1 | 8 | 9 | 10 | 11 | 12 | 13 | 14 | 15 |
| 2 | 16 | 17 | 18 | 19 | 20 | 21 | 22 | 23 |
| 3 | 24 | 25 | 26 | 27 | 28 | 29 | 30 | 31 |
| 4 | 32 | 33 | 34 | 35 | 36 | 37 | 38 | 39 |
| 5 | 40 | 41 | 42 | 43 | 44 | 45 | 46 | 47 |
| 6 | 48 | 49 | 50 | 51 | 52 | 53 | 54 | 55 |
| 7 | 56 | 57 | 58 | 59 | 60 | 61 | 62 | 63 |

METHOD AND APPARATUS FOR CHANGING RESOLUTION BY DIRECT DCT MAPPING

FIELD OF THE INVENTION

This invention relates to a processor for changing the number of samples in a coded signal by directly mapping in the spatial frequency domain original transform coefficients in the coded signal to new transform coefficients, and more particularly, to changing the resolution of an encoded image, e.g., an image represented by MPEG-2 encoded video signals, by directly mapping original discrete cosine transform coefficients to new discrete cosine transform coefficients.

BACKGROUND OF THE INVENTION

In the United States a standard has been proposed for digitally encoded high definition television signals. A portion of this standard is essentially the same as the MPEG-2 standard, proposed by the Moving Picture Experts Group (MPEG) of the International Organization for Standardization (ISO). The standard is described in a International Standard (IS) publication entitled, "Information Technology—Generic Coding of Moving Pictures and Associated Audio, Recommendation H.626", ISO/IEC 13818-2: 1995 (E) which is available from the ISO and which is hereby incorporated by reference for its teaching on the MPEG-2 digital video coding standard.

The MPEG-2 standard is actually several different standards. In MPEG-2, several different profiles are defined, each corresponding to a different level of complexity of the encoded image. For each profile, different levels are defined, each level corresponding to a different image resolution. One of the MPEG-2 standards, known as Main Profile, Main Level (MP@ML) is intended for coding video signals conforming to existing television standards (i.e., NTSC and PAL). Another standard, known as Main Profile, High Level (MP@HL) is intended for coding high-definition television images.

Images encoded according to the MP@HL standard may have as many as 1,152 active lines per image frame and 1,920 pixels per line. The MP@ML standard, on the other hand, defines a maximum picture size of 720 pixels per line and 567 lines per frame. The high definition television standard proposed for HDTV encoding in the United States is a subset of the MP@HL standard, having as many as 1,080 lines per frame, 1,920 pixels per line and a maximum frame rate, for this frame size, of 30 frames per second.

The MPEG-2 standard defines a complex syntax which contains a mixture of data and control information. Some of this control information is used to enable signals having several different formats to be covered by the standard. These formats define images, having differing numbers of picture elements (pixels) per line, differing numbers of lines per frame or field and differing numbers of frames or fields per second. In addition, the basic syntax of the MPEG-2 Main Profile defines the compressed MPEG-2 bit stream representing a sequence of images in six layers, the sequence layer, the group of pictures layer, the picture layer, the slice layer, the macroblock layer, and the block layer. Each of these layers except the block layer is introduced with control information. Finally, other control information, also known as side information, (e.g. frame type, macroblock pattern, image motion vectors, coefficient zig-zag patterns and dequantization information) are interspersed throughout the coded bit stream.

An implementation of a HDTV system should be compatible with existing systems such as NTSC and PAL. Accordingly, to effectively receive the digital images, an HDTV decoder should be able to generate a picture corresponding to the MP@HL standard or the MP@ML standard to provide compatibility with existing receivers or transmitters. For example, the HDTV decoder should be able to generate a picture corresponding to the MP@HL standard from a MP@ML encoded signal or a picture corresponding to the MP@ML standard from a MP@HL encoded signal.

In addition, the use of new receivers having a high definition video monitor which can display an image generated from a MP@HL signal may be cost prohibitive for certain customers. Accordingly, an HDTV decoder which can generate a picture corresponding to the MP@HL standard or the MP@ML standard will allow the use of newer, lower cost receivers which have video monitors that provide a higher resolution than MP@ML but less than MP@HL. A television set containing one of these monitors should still be able to display an image generated from a MP@HL signal albeit at a lower resolution.

Using existing techniques, a decoder may be implemented using an interpolation circuit to interpolate or decimate signals in the pixel domain to reduce the resolution of the image from MP@HL to the MP@ML. To process an MP@HL encoded image to produce an MP@ML signal by these conventional methods, the MP@HL encoded image is converted from the spatial frequency domain to the pixel domain, interpolated to produce a reduced resolution image, and then the interpolated image is converted back to the spatial frequency domain. This type of processing would be contrary to the implementation of a decoder in a consumer television receiver in which cost is a major factor. Additional circuitry would be required to decode, interpolate or decimate, and then code the signal. Furthermore, the decoding and encoding operations may introduce undesired artifacts into the image that is represented by the reduced-resolution coded signal.

Another alternative is to use a decoder which selects a portion of the incoming HDTV bit stream, before decoding, as shown in *SDTV RECEIVERS WITH HDTV DECODING CAPABILITY*, by Jill Boyce et al., dated Febuary 1995 and presented at the ACATS Technical Subgroup Meeting, May 18, 1995. The decoder disclosed in the paper utilizes a number of techniques in an attempt to reduce the cost and complexity for a standard television receiver. A pre-parser examines the incoming bit-stream and discards coding elements, DCT coefficients, of less importance. These elements include the high frequency DCT coefficients. The coding elements are then converted from the spatial frequency domain to pixels in the pixel domain. The pixels are then down-sampled to produce pixels for a lower resolution image.

There are other systems which have been proposed which utilize other transform techniques to encode an image. For example, Fourier Transforms and Z-transforms have been used to encoded images in the spatial frequency domain. One such system is shown at page 18.3 of the *Television Engineering Handbook* by K. Blair Benson, dated 1992, which is incorporated herein by reference for its teachings on digitally encoding images. This system utilizes Fourier Transforms to encode the image. As in the MPEG standard, this system could be used to encode images at different resolutions. Thus, the need for the conversion between higher and lower resolution images to provided compatibility between different receivers is also required for these systems.

SUMMARY OF THE INVENTION

The present invention is embodied in an apparatus for transforming the resolution of an image from a first image resolution to a second image resolution using operations in the spatial frequency domain. A first group of transform values which represent the image at the first image resolution are mapped to a second group of transform values which represent the image at the second image resolution in the spatial frequency domain. The apparatus includes stored pre-computed values which are the mapping coefficient values between the first group of transform values and the second group of transform values. The pre-computed values are retrieved from a memory and used to directly map the first group of transform values to the second group of transform values in the spatial frequency domain.

BRIEF DESCRIPTION OF THE DRAWINGS

FIG. 1 is a block diagram of a DCT conversion apparatus in accordance with an exemplary embodiment of the present invention.

FIG. 3 (a) is a data structure diagram illustrating six macroblocks.

FIG. 3(b) is a data structure diagram illustrating the contents of one of the macroblocks shown in FIG. 3(a).

FIG. 3(c) is a data structure diagram illustrating a converted macroblock CMB generated from the six macroblocks shown in FIG. 3(a).

FIGS. 5(a) and 5(b) are charts illustrating the format of the MPEG scan pattern 0 and the MPEG scan pattern 1.

FIG. 5(c) is a chart illustrating the format of the DCT coefficients after inverse zig-zag scan by inverse zig-zag scan memory 120 shown in FIG. 6.

DETAILED DESCRIPTION OF THE EXEMPLARY EMBODIMENTS

Figure 2A:
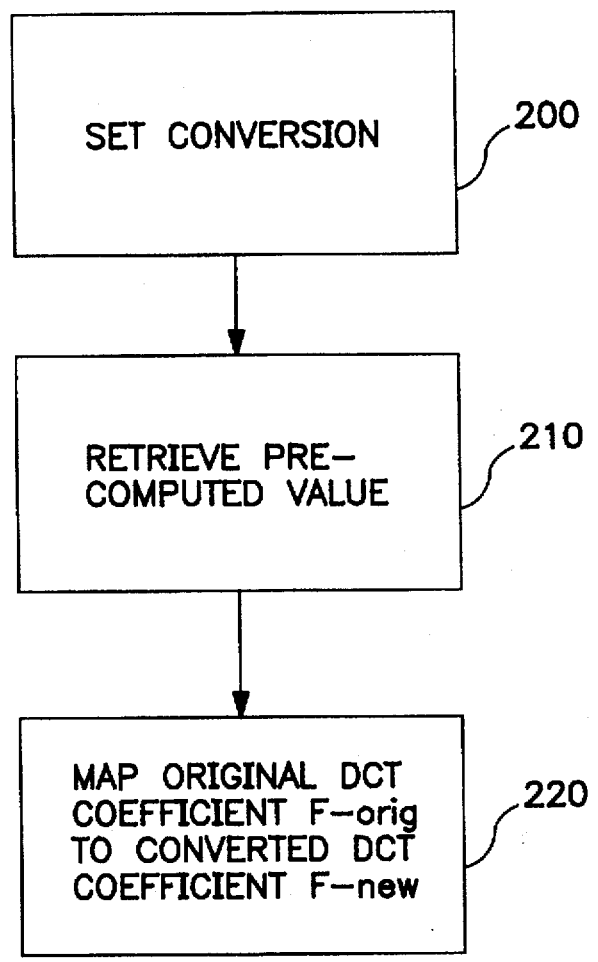
FIGS. 2(a) and 2(b) are flow chart diagrams illustrating the operation of the DCT converter 140 shown in FIG. 1 in accordance with an exemplary embodiment of the present invention.

The exemplary embodiment of the present invention changes the resolution of an image to a different resolution by mapping DCT coefficient values $F'_{i'j'}(u',v')$ of the original image into converted coefficient values $F_{ij}(u,v)$ in the spatial frequency domain. As a result, the original DCT coefficient values $F'_{i'j'}(u',v')$ do not have to be converted to pixels in the pixel domain to increase or decrease the resolution of the image by, for example, decimation or interpolation in the pixel domain. Thus, the need for additional circuitry to convert the coefficients to pixels to decimate or interpolate the pixels and to correct the decimated or interpolated pixels back to DCT coefficient values is eliminated.

Overview

The conversion of the original DCT coefficient values $F'_{i'j'}(u',v')$ to the converted DCT coefficient values $F_{ij}(u,v)$ in the transform domain is feasible because there are correlations of the spatial pixels in the picture before and after the conversion which translates to a correlation between the DCT coefficient values at different resolutions. Transform values in the spatial frequency domain for other transform methods including, for example, Fourier Transforms and Z-transforms, can also be converted to converted transform values because there are correlations of values in the time domain before and after the conversion which translates to a correlation between the transform values at different resolutions.

The original DCT coefficients values $F'_{i'j'}(u',v')$ define an image having a first resolution and are produced by converting the pixels in the image to DCT coefficient values using an N point two-dimensional DCT. The N point two-dimensional DCT is defined in equation (1):

$$F_{ij}(u',v') = \qquad (1)$$

$$\frac{2}{N} \cdot c(u')c(v') \sum_{m=0}^{N-1} \sum_{n=0}^{N-1} f'_{ij}(m,n) \cos\frac{(2m+1)u'\pi}{2N} \cos\frac{(2n+1)v'\pi}{2N}$$

$F'_{i'j'}(u',v')$ is the original DCT coefficient value for the j'-th block and the i'-th macroblock where u' and v' are coordinates in the spatial frequency domain and u',v'=0, 1, 2, ... N−1; $f'_{i'j'}(m,n)$ is a pixel value in the image where m and n are spatial coordinates in the pixel domain and m,n=0 ..., N−1; and c(u') and c(v') are the transformation coefficient values defined in equation (2):

$$c(i) = \begin{cases} (1/\sqrt{2}) & \text{for } i = 0 \\ 1 & \text{otherwise} \end{cases} \qquad (2)$$

Conversely, a pixel value $f'_{i'j'}(m,n)$ of the image can be produced from the original DCT coefficient values $F'_{i'j'}(u',v')$ using an N point inverse discrete cosine transform (IDCT). The N point IDCT is defined by equation (3):

$$f_{ij}(m,n) = \qquad (3)$$

$$\frac{2}{N} \sum_{u'=0}^{N-1} \sum_{v'=0}^{N-1} c(u')c(v')F_{ij}(u',v')\cos\frac{(2m+1)u'\pi}{2N} \cos\frac{(2n+1)v'\pi}{2N}$$

The resolution of the image can be increased or decreased by, for example, interpolation or decimation of the pixel values $f'_{i'j'}(m,n)$ in the pixel domain. For example, a converted pixel value $f_{ij}(x,y)$ can be produced from the original pixel values $f'_{i'j'}(m,n)$ using a linear superposition of pixels of the original image in the pixel domain as shown in equation (4):

$$f_{ij}(x,y) = \sum_{i'}\sum_{j'} \sum_{m=0}^{N-1} \sum_{n=0}^{N-1} \alpha_{i'j',m,n}^{ij,x,y} \cdot f'_{i'j'}(m,n) \qquad (4)$$

α is the conversion coefficient between the original pixel values $f'_{i'j'}(m,n)$ and the converted pixel values $f_{ij}(x,y)$. The image defined by the converted pixel values $f_{ij}(x,y)$ has a different resolution than the image defined by the original pixel values $f'_{i'j'}(m,n)$.

Converted DCT coefficient values $F_{ij}(u,v)$ can be produced from the converted pixel values $f_{ij}(x,y)$ using equation (5):

$$F_{ij}(u,v) = \frac{2}{N} \cdot c(u)c(v) \sum_{x=0}^{N-1}\sum_{y=0}^{N-1} f_{ij}(x,y) \cos\frac{(2x+1)u\pi}{2N} \cos\frac{(2y+1)v\pi}{2N} \quad (5)$$

$F_{ij}(u,v)$ is the converted DCT coefficient value for the j-th block and the i-th macroblock where u and v are coordinates in the spatial frequency domain in the converted image and $u,v=0\ldots,N-1$ and $f_{ij}(x,y)$ is the converted pixel value where x and y are spatial coordinates in the pixel domain of the converted image and $x,y=0\ldots,N-1$. The correlation between the original pixel values $f'_{i'j'}(m,n)$ and the converted DCT coefficient values $F_{ij}(u,v)$ is demonstrated below in equation (6) in which equation (5) is rewritten by substituting the right hand side of equation (4) for the converted pixel values $f_{ij}(x,y)$.

$$F_{ij}(u,v) = \frac{2}{N} \cdot c(u)c(v) \cdot \sum_{x=0}^{N-1}\sum_{y=0}^{N-1} \left( \sum_{i'}\sum_{j'}\sum_{m=0}^{N-1}\sum_{n=0}^{N-1} \alpha^{ij,x,y}_{i'j',m,n} \cdot f'_{i'j'}(m,n) \right) \cos\frac{(2x+1)u\pi}{2N} \cos\frac{(2y+1)v\pi}{2N} \quad (6)$$

Since the original pixel values $f'_{i'j'}(m,n)$ can be expressed in terms of the original DCT coefficient values $F'_{i'j'}(u',v')$ as shown in equation (3), the converted DCT coefficient values $F_{ij}(u,v)$ can be expressed in terms of the original DCT coefficient values $F'_{i'j'}(u',v')$. This is demonstrated in equation (7) below in which the right hand side of equation (3) is substituted for the original pixel value $F'_{i'j'}(m,n)$ shown in equation (6).

$$F_{ij}(u,v) = \frac{4}{N^2} \cdot c(u)c(v) \cdot \quad (7)$$

$$\sum_{i'}\sum_{j'}\sum_{u'=0}^{N-1}\sum_{v'=0}^{N-1}\sum_{x=0}^{N-1}\sum_{y=0}^{N-1}\sum_{m=0}^{N-1}\sum_{n=0}^{N-1} \alpha^{ij,x,y}_{i'j',m,n} \cos\left[\frac{(2x+1)u\pi}{2N}\right] \cos\left[\frac{(2y+1)v\pi}{2N}\right] \cdot$$

$$\cos\left[\frac{(2m+1)u'\pi}{2N}\right] \cos\left[\frac{(2n+1)v'\pi}{2N}\right] \cdot c(u')c(v')F'_{i'j'}(u',v')$$

Equation (7) can be rewritten as equations (8) and (9):

$$F_{ij}(u,v) = \sum_{i'}\sum_{j'}\sum_{u'=0}^{N-1}\sum_{v'=0}^{N-1} PCV^{ij,u,v}_{i'j',u',v'} \cdot F'_{i'j'}(u',v') \quad (8)$$

where:

$$PCV^{ij,u,v}_{i'j',u',v'} = \frac{4}{N^2} \cdot c(u)c(v)c(u')c(v') \cdot \quad (9)$$

$$\sum_{x=0}^{N-1}\sum_{y=0}^{N-1}\sum_{m=0}^{N-1}\sum_{n=0}^{N-1} \alpha^{ij,x,y}_{i'j',m,n} \cos\frac{(2x+1)u\pi}{2N} \cos\frac{(2y+1)v\pi}{2N} \cdot$$

$$\cos\frac{(2m+1)u'\pi}{2N} \cos\frac{(2n+1)v'\pi}{2N}$$

m and n are spatial coordinates of the original pixel values $f'_{i'j'}(m,n)$ in the pixel domain and $m,n=0,\ldots,v$, x and y are spatial coordinates of converted pixel values $f_{ij}(x,y)$ in the pixel domain and $x,y=0\ldots N-1$, u' and v' are coordinates in the spatial frequency domain of the original DCT coefficient values $F'_{i'j'}(u',v')$ and $u',v'=0, 1, 2, \ldots N-1$; u and v are coordinates in the spatial frequency domain of the converted DCT coefficient values $F_{ij}(u,v)$ and $u,v=0, 1, 2, \ldots N-1$; and $\alpha$ is the conversion coefficient.

Exemplary values for the conversion coefficient $\alpha$ are shown in Tables 1–6 below for converting six macroblocks, arranged as three by two macroblocks, into one macroblock and as described below. Since each value, x, y, m, n, u, v, u', v', and $\alpha$ in equation (9) is a known constant, the pre-computed values PCV can be calculated using equation (9) independent of the original DCT coefficients values $F'_{i'j'}(u', v')$ to be converted. The calculation of the pre-computed value PCV does not depended upon the original DCT coefficient values $F'_{i'j'}(u',v')$ or the converted DCT coefficient values $F_{ij}(u,v)$. The pro-computed values PCV are used to convert any original DCT coefficient values $F'_{i'j'}(u',v')$ to converted coefficient values $F_{ij}(u,v)$ for a conversion of six macroblocks, arranged as three by two macroblocks, into one converted macroblock.

As described above, the converted DCT coefficient values $F_{ij}(u,v)$ correspond to an image having a different resolution than the image represented by the original DCT coefficient values $F'_{i'j'}(u',v')$. Therefore, the resolution of an image can be changed by mapping the original DCT coefficient values $F'_{i'j'}(u',v')$ to the converted DCT coefficient values $F_{ij}(u,v)$. This eliminates the need for additional circuitry to convert the original DCT coefficient values $F'_{i'j'}(u',v')$ to pixels values to perform interpolation or decimation and the circuitry required to convert the pixels back to converted DCT coefficient values $F_{ij}(u,v)$ to complete processing. In addition, the processing time to convert the image is decreased by eliminating the steps of converting the DCT coefficients to pixel values, processing the pixel values and then converting the processed pixel values back to DCT coefficients. Finally, the converted image produced by this method has fewer artifacts than an image that has been converted into the pixel domain, interpolated, and then converted back into the spatial frequency domain.

DESCRIPTION OF EXEMPLARY EMBODIMENTS

FIG. 1 illustrates the overall organization of a DCT conversion apparatus 5 which maps original DCT coefficient values $F'_{ij}(u',v')$ to converted DCT coefficient values $F_{ij}(u,v)$ in the spatial frequency domain in accordance with an exemplary embodiment of the present invention. The DCT conversion apparatus 5 either reduces or increases the number of original DCT coefficient values $F'_{i'j'}(u',v')$.

As shown in FIG. 1, encoded image data represented by original DCT coefficient values $F'_{i'j'}(u',v')$ are stored in memory 10. The encoded image data is, for example, a MP@HL or MP@ML encoded image. The original DCT coefficient values $F'_{i'j'}(u',v')$ are arranged in macroblocks and are not quantize. The original DCT coefficient values $F'_{i'j'}(u',v')$ are provided to DCT converter 140 which maps the original DCT coefficients $F'_{i'j'}(u',v')$ into converted coefficient values $F_{ij}(u,v)$ which represent a reduced-resolution image or an increased resolution image. For example, when the input bit-stream is converted from MP@HL to MP@ML, the number of DCT coefficients is reduced. When the input bit-stream is converted from MP@ML to MP@HL, the number of DCT coefficients is increased. The converted DCT coefficients are stored in memory 30. DCT converter 140 is described in greater detail below.

DCT converter 140 maps the original DCT coefficient values $F'_{i'j'}(u',v')$ to the converted coefficient values $F_{ij}(u,v)$ in response to a control signal CS2 which specifies the change in resolution of the image i.e.—converting a 1920 by 1080 interlaced image to a 640 by 540 interlaced image. In response to the control signal CS2, original DCT coefficient values $f'_{i'j'}$, (v', v') are retrieved from memory 10 and pre-computed values PCV stored in memory 40 are retrieved in response to select signal SS1. Memory 40 is, for example, a random access memory or a read only memory.

The pre-computed values PCV, as described above, can be calculated independent of the original DCT coefficient values $F'_{i'j'}(u',v')$. The pre-computed values PCV are stored in memory 40 prior to converting the original DCT coefficient values $F'_{i'j'}(u',v')$ to converted DCT coefficient values $F_{ij}(u,v)$. The pre-computed values PCV are retrieved from memory 40 as described below. As shown in equation (8) and described in greater detail below, the original DCT coefficient values $F'_{i'j'}(u',v')$ are multiplied by corresponding pre-computed values PCV and summed to produce converted pre-computed values $F_{ij}(u,v)$ in the spatial frequency domain.

The DCT converter 140 is explained below in greater detail with reference to FIGS. 2–4. First, at step 200 shown in FIG. 2(a), the DCT converter 140 is set in response to control signal CS2 to convert the original DCT coefficient values $F'_{i'j'}(u',v')$ in the spatial frequency domain. Control signal CS2 specifies the change in resolution of the image to be converted.

The original DCT coefficient values $F'_{i'j'}(u',v')$ are contained in macroblocks. FIG. 3(a) is a data structure diagram illustrating six macroblocks MB0–MB5 which constitute a portion of an image to be converted.

As shown in FIG. 3(b), each macroblock MB0–MB5 comprises six blocks: four luminance blocks b0–b3 and two chrominance blocks b4 and b5. This format is identified as 4:2:0 in the MPEG-2 standard.

As shown in FIG. 5(c), each block of the blocks b0–b5 contain sixty four DCT coefficients assigned an address value z1 of zero to sixty three. Alternatively, the address value could be specified by the spatial coordinates u', v' of the original DCT coefficient values $F'_{i'j'}(u',v')$. Each of the converted DCT coefficient values $F_{ij}(u,v)$ also contains sixty four DCT coefficients, each assigned an address value z of zero to sixty three. The original DCT coefficient values are retrieved from memory 10 by specifying the address value z1 of the original DCT coefficient value, the j'-th block which includes the original DCT coefficient value, and the i'-th macroblock which includes the j'-th block.

Figure 4:
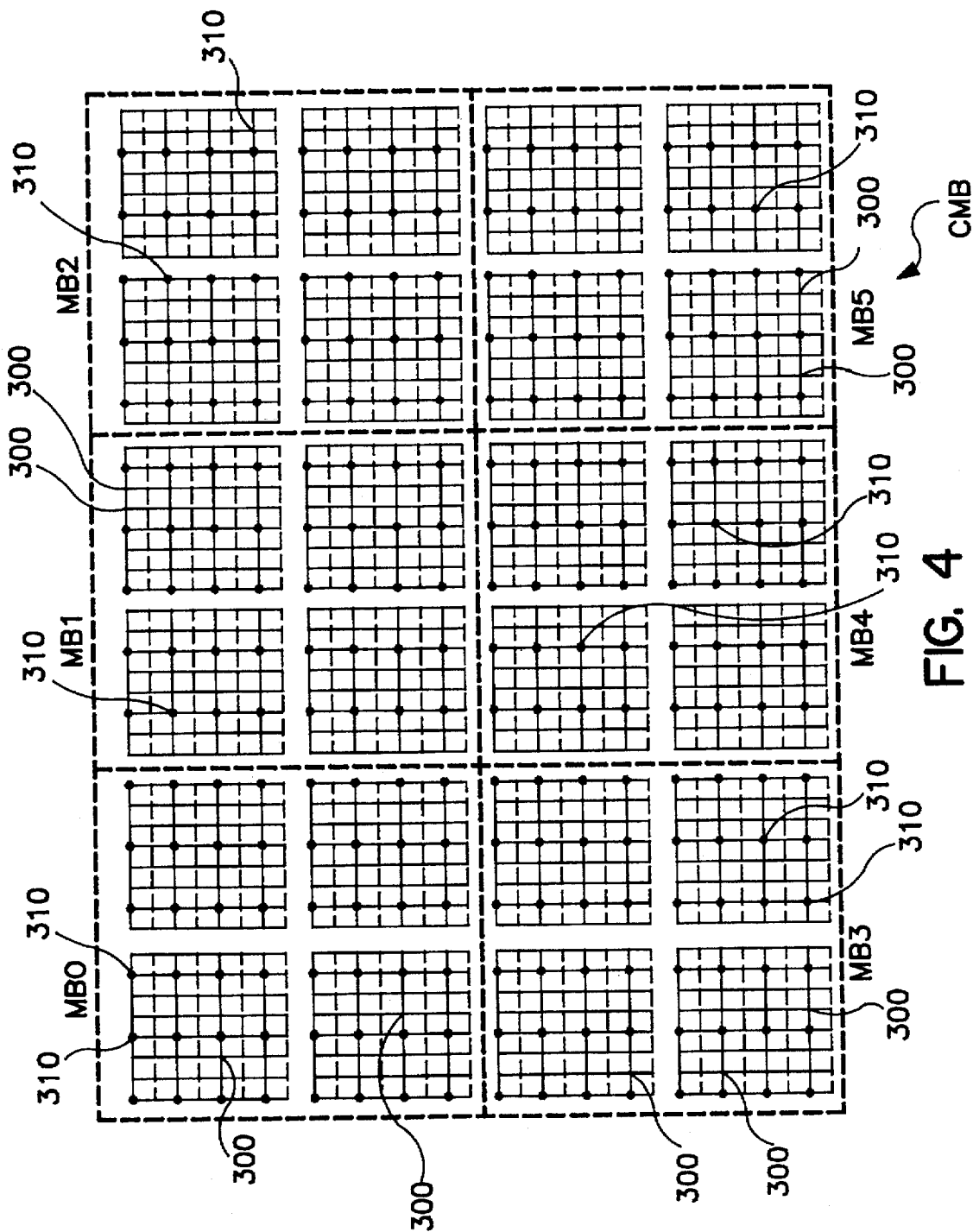
FIG. 4 is a data structure diagram illustrating the mapping of six macroblocks to one macroblock in the pixel domain.

The conversion of the macroblocks in FIG. 3(a) is shown in FIG. 4, where the image is represented by pixels in the pixel domain and arranged into macroblocks MB0–MB8 where the macroblocks are in frame format. Original pixel values $F'_{i'j'}(m,n)$ are located at each of the indices 300 and the converted pixel values $f_{ij}(u,v)$ are located at each of the indices 310 having a filled circle. In FIG. 4, the original image is 1920 by 1080 pixels and the converted image is 640 by 540 pixels. The original image is effectively horizontally decimated by three and effectively vertically decimated by two to produce an image having a 640 by 540 pixel resolution. The effective decimation factors for horizontal and vertical directions are determined in response to the control signal CS2. There is a corresponding set of pre-computed values PCV stored in memory 40 for each set of horizontal and vertical decimation factors $\alpha_{i',j',m,n}^{i,j,x,y}$. As described above, the pre-computed values PCV are calculated using equation (9) and stored at respective memory locations in memory 40 shown in FIG. 1.

Next, at step 210 as shown in FIG. 2(a), the pre-computed values PCV are retrieved from memory 40 and provided to DCT converter 140. The pre-computed values PCV are selected from memory 40 in response to the macroblock, block, and the address value of the original DCT coefficient values and the converted DCT coefficient values. The pre-computed values PCV are stored at an address in memory 40 specified by address signal SS1. Address signal SS1 provides the address of the pre-computed value PCV for converting the z1-th DCT coefficient value of the j'-th block of the i'-th original macroblock to the z-th DCT coefficient value of the j-th block of the converted macroblock. z1 is the address value of the original DCT coefficient value and z is the address value of the converted DCT coefficient value.

Next, at step 220, the converted coefficient values $F_{ij}(u,v)$ are produced using the original DCT coefficient values $F'_{i'j'}(u',v')$ and the pre-computed values PCV in accordance with equation (8). Table 0 below is exemplary C code for determining the converted coefficient values $F_{ij}(u,v)$ using the original DCT coefficient values $F'_{i'j'}(u',v')$ and pre-computed values PCV. In Table 1, the values are defined as:

j: designates the j-th block of the converted macroblock;
z. designates the z-th DCT coefficient value of the j-th block of the converted macroblock;
i1: designates the i'-th macroblock of the original macroblocks;
j1: designates the j'-th block of the i'-th original macroblock;
z1: designates the z1-th DCT coefficient value of the j'-th block of the i'-th original macroblock;
map [j] [z] [i1] [j1] [z1]: designates the pre-computed value PCV for converting between (1) the z-th DCT coefficient value of the j-th block of the converted macroblock and (2) the z1-th DCT coefficient value of the j'-th block of the i'-th original macroblock;
mb_old: designates the original macroblocks MB0–MB5;
mb_new: designates the converted macroblock; and
declip(): designates clipping the DCT coefficients in the range of [−2048, 2048].

TABLE 1

```
dct_mapping (mb_old, mb_new)
short mb_old[6] [6] [64];      /* 6 input MB's */
short mb_new[6] [64];          /* 1 New output MB */
{
  register double sum;
  int j,j1,i1,z,z1;
  int x, y;
                                 /* Y, luminance */
  for (j=0; j<4; j++) {          /* 4 DCT blocks */
    for (z=0; z<64; z++) {       /* 8 by 8 output DCT
                                    coefficient for
                                    each block */
      sum = 0
```

TABLE 1-continued

```
      for (i1=0; i1<6; i1++) {        /* 6 input MB's */
          for (j1=0; j1<4; j1++) {    /* 4 DCT blocks */
              for (z1=0; z1<64; z1++) {    /* 8 by 8 DCT
                                              coefficients */
                  sum +=
                      (map[j] [z] [i1] [j1] [z1]
                      *mb_old[i1] [j1] [z1]);
              }
          }
      }
      mb_new[j] [z] = dclip(sum);
  }
}
                                    /* Chrominance Cr and
                                       Cb */
  for (j=4; j<6; j++) {             /* one block for each
                                       Cr and Cb */
      for (z=0; z<64; z++) {        /* 8 by 8 output DCT
                                       coefficient for each
                                       block */
          sum = 0;
          for (i1=0; i1<6; i1++) {        /* 6 input MB's */
              for (z1=0; z1<64; z1++) {   /* 8 by 8 input
                                             DCT coefficient for
                                             each block */
                  sum += (mapC[z] [i1] [z1]*mb_old[i1] [j] [z1]);
              }
          }
          mb_new[j] [z] = dclip(sum);
      }
  }
}
```

Figure 2B:
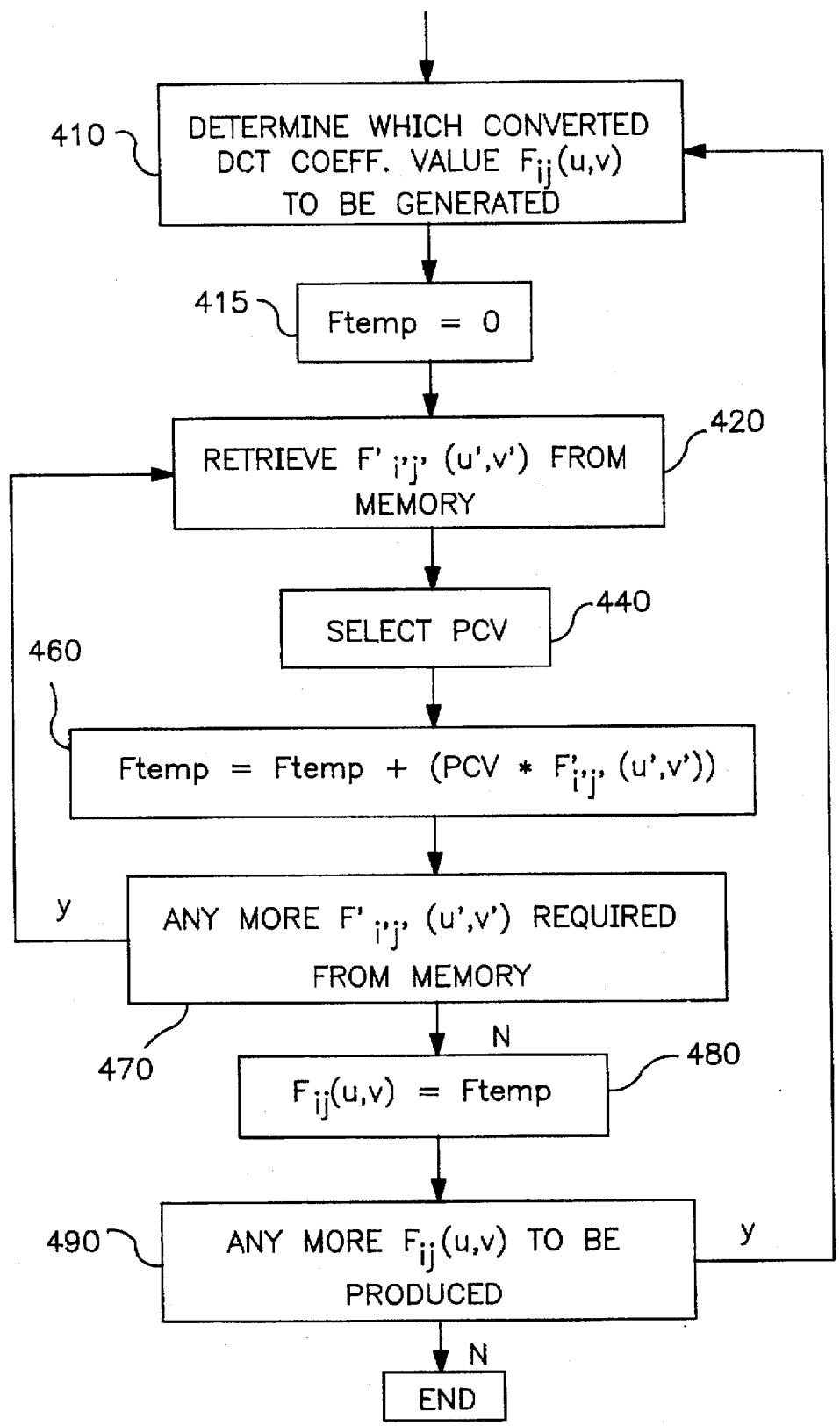

Steps 210 and 220 and the code in Table 1 are explained with reference to the flow chart shown in FIG. 2(b). First, at step 410, it is determined which converted DCT coefficient value $F_{ij}(u,v)$ is to be produced. For a conversion from six macroblocks to one macroblock, sixty four converted DCT coefficient values are produced. The converted DCT coefficient values are produced consecutively starting with the converted DCT coefficient value assigned an address value of zero to the last converted DCT coefficient value assigned an address value of sixty three. Then, at step 415, the value F-temp is set equal to zero.

Next, at step 420, an original DCT coefficient value $F'_{ij}(u',v')$ is retrieved from memory 10 shown in FIG. 1. DCT converter 140, shown in FIG. 1, maintains an address for each of the original DCT coefficient values $F'_{ij}(u',v')$ stored in memory 40. The address is specified by the address value z1, the block value j1, and the macroblock value i1 for the original DCT coefficient values $F'_{ij}(u',v')$. The address value z1 identifies one of the original DCT coefficient values $F'_{ij}(u',v')$, the value j1 specifies from which block the original DCT coefficient values $F'_{ij}(u',v')$ are retrieved, and the value i1 specifies from which macroblock the original DCT coefficient values $F'_{ij}(u',v')$ are retrieved. The addresses for retrieving the original DCT coefficient values $F'_{ij}(u',v')$ from memory 40 are produced by DCT converter 140.

DCT converter 140 determines which original DCT coefficient values $F'_{ij}(u',v')$ are retrieved in accordance with the original DCT coefficient values $F'_{ij}(u',v')$ specified in equation (8) and used to calculate the next converted DCT coefficient value $F_{ij}(u,v)$ determined at step 410.

For example, as shown in the code above in Table 1, the luminance macroblock for the converted macroblock is produced from each of the DCT coefficient values $F'_{ij}(u',v')$ in each of the original six macroblocks. The original DCT coefficients $F'_{ij}(u',v')$ are consecutively retrieved from the first block in the first original macroblock. That is, each time step 420 is repeated, the next consecutive original DCT coefficient value is retrieved. Once all of the original DCT coefficients $F'_{ij}(u',v')$ are retrieved from the first block, the original DCT coefficient values $F'_{ij}(u',v')$ in the next block in the first macroblock are retrieved. Once all of the original DCT coefficients $F'_{ij}(u',v')$ in the first macroblock have been retrieved, original DCT coefficient values are retrieved from the first block of the next macroblock. This process is repeated until all of the original DCT coefficient values $F'_{ij}(u',v')$ in each of the macroblocks have been retrieved.

Next, at step 440, DCT converter selects pre-computed values PCV from memory 40. As shown in the code of Table 1, the values z, j, z1, j1, and i1 are also used to determine which pre-computed values are retrieved from memory 40. As described above, there is a pre-computed value PCV stored in memory for mapping between the z-th converted DCT coefficient of the j-th block of the converted macroblock and the z1-th original DCT coefficient of the j1-th block of the i1-th macroblock.

The pre-computed values are calculated using the values $\alpha$ shown in Tables 1–6 below as described above and shown in equation (9).

Table 2 includes the values $\alpha$ used to convert luminance block b0, Table 3 includes the values $\alpha$ used to convert luminance block b1, Table 4 includes the values $\alpha$ used to convert luminance block b2, Table 5 includes the values $\alpha$ used to convert luminance block b3, Table 6 includes the values $\alpha$ used to convert chrominance block b4, and Table 7 includes the values $\alpha$ used to convert chrominance block b5. The pre-computed values PCV are generated from the values $\alpha$ in Tables 1–6.

TABLE 2

| | |
|---|---|
| $\alpha^{0,0,xy}_{0,0,3x,2y} = 1$ | for x < 3, y < 4 and even |
| $\alpha^{0,0,xy}_{0,0,3x,2y-1} = \frac{1}{2}$ | for x < 3, y < 4 and odd |
| $\alpha^{0,0,xy}_{0,0,3x,2y+1} = \frac{1}{2}$ | for x < 3, y < 4 and odd |
| $\alpha^{0,0,xy}_{0,1,3(x-3),2y} = 1$ | for 3 <= x < 6, and y < 4 and even |
| $\alpha^{0,0,xy}_{0,1,3(x-3)+1,2y-1} = \frac{1}{2}$ | for 3 <= x < 6, and y < 4 and odd |
| $\alpha^{0,0,xy}_{0,1,3(x-3)+1,2y+1} = \frac{1}{2}$ | for 3 <= x < 6, and y < 4 and odd |
| $\alpha^{0,0,xy}_{1,0,3(x-6),2y} = 1$ | for x >= 6, and y < 4 and even |
| $\alpha^{0,0,xy}_{1,0,3(x-6)+2,2y-1} = \frac{1}{2}$ | for x >= 6, and y < 4 and odd |
| $\alpha^{0,0,xy}_{1,0,3(x-6)+2,2y+1} = \frac{1}{2}$ | for x >= 6, and y < 4 and odd |
| $\alpha^{0,0,xy}_{0,2,3x,2(y-4)} = 1$ | for x < 3, y >= 4 and even |
| $\alpha^{0,0,xy}_{0,2,3x,2(y-4)-1} = \frac{1}{2}$ | for x < 3, y >= 4 and odd |
| $\alpha^{0,0,xy}_{0,2,3x,2(y-4)+1} = \frac{1}{2}$ | for x < 3, y >= 4 and odd |
| $\alpha^{0,0,xy}_{0,3,3(x-3)+1,2(y-4)} = 1$ | for 3 <= x < 6, and y >= 4 and even |
| $\alpha^{0,0,xy}_{0,3,3(x-3)+1,2(y-4)-1} = \frac{1}{2}$ | for 3 <= x < 6, and y >= 4 and odd |

TABLE 2-continued

| | |
|---|---|
| $\alpha_{3,3(x-3)+1,2(y-4)+1}^{0,0,x,y} = \frac{1}{2}$ | for $3 <= x < 6$, and $y >= 4$ and odd |
| $\alpha_{1,2,3(x-6)+2,2(y-4)}^{0,0,x,y} = 1$ | for $x >= 6$, and $y >= 4$ and even |
| $\alpha_{1,2,3(x-6)+2,2(y-4)-1}^{0,0,x,y} = \frac{1}{2}$ | for $x >= 6$, and $y >= 4$ and odd |
| $\alpha_{1,2,3(x-6)+2,2(y-4)+1}^{0,0,x,y} = \frac{1}{2}$ | for $x >= 6$, and $y >= 4$ and odd |

TABLE 3

| | |
|---|---|
| $\alpha_{1,1,3x,2y}^{0,1,x,y} = 1$ | for $x < 3$, and $y >= 4$ and even |
| $\alpha_{1,1,3x,2y-1}^{0,1,x,y} = \frac{1}{2}$ | for $x > 3$, and $y >= 4$ and odd |
| $\alpha_{1,1,3x,2y+1}^{0,1,x,y} = \frac{1}{2}$ | for $x > 3$, and $y >= 4$ and odd |
| $\alpha_{2,0,3(x-3)+1,2y}^{0,1,x,y} = 1$ | for $3 <= x < 6$, and $y >= 4$ and even |
| $\alpha_{2,0,3(x-3)+1,2y-1}^{0,1,x,y} = \frac{1}{2}$ | for $3 <= x < 6$, and $y >= 4$ and odd |
| $\alpha_{2,0,3(x-3)+1,2y+1}^{0,1,x,y} = \frac{1}{2}$ | for $3 <= x < 6$, and $y >= 4$ and odd |
| $\alpha_{2,1,3(x-6)+2,2y}^{0,1,x,y} = 1$ | for $x >= 6$, and $y >= 4$ and even |
| $\alpha_{2,1,3(x-6)+2,2y-1}^{0,1,x,y} = \frac{1}{2}$ | for $x >= 6$, and $y >= 4$ and odd |
| $\alpha_{2,1,3(x-6)+2,2y+1}^{0,1,x,y} = \frac{1}{2}$ | for $x >= 6$, and $y >= 4$ and odd |
| $\alpha_{1,3,3x,2(y-4)}^{0,1,x,y} = 1$ | for $x < 3$ and $y >= 4$ and even |
| $\alpha_{1,3,3x,2(y-4)-1}^{0,1,x,y} = \frac{1}{2}$ | for $x > 3$, and $y >= 4$ and odd |
| $\alpha_{1,3,3x,2(y-4)+1}^{0,1,x,y} = \frac{1}{2}$ | for $x > 3$, and $y >= 4$ and odd |
| $\alpha_{2,2,3(x-3)+1,2(y-4)}^{0,1,x,y} = 1$ | for $3 <= x < 6$ and $y >= 4$ and even |
| $\alpha_{2,2,3(x-3)+1,2(y-4)-1}^{0,1,x,y} = \frac{1}{2}$ | for $3 <= x < 6$, and $y >= 4$ and odd |
| $\alpha_{2,2,3(x-3)+1,2(y-4)+1}^{0,1,x,y} = \frac{1}{2}$ | for $3 <= x < 6$, and $y >= 4$ and odd |
| $\alpha_{2,3,3(x-6)+2,2(y-4)}^{0,1,x,y} = 1$ | for $x >= 6$, and $y >= 4$ and even |
| $\alpha_{2,3,3(x-6)+2,2(y-4)-1}^{0,1,x,y} = \frac{1}{2}$ | for $x >= 6$ and $y >= 4$ and odd |
| $\alpha_{2,3,3(x-6)+2,2(y-4)+1}^{0,1,x,y} = \frac{1}{2}$ | for $x >= 6$, and $y >= 4$ and odd |

TABLE 4

| | |
|---|---|
| $\alpha_{5,0,3x,2y}^{0,2,x,y} = 1$ | for $x < 3$, $y < 4$ and even |
| $\alpha_{5,0,3x,2y-1}^{0,2,x,y} = \frac{1}{2}$ | for $x < 3$, $y < 4$ and odd |
| $\alpha_{5,0,3x,2y+1}^{0,2,x,y} = \frac{1}{2}$ | for $x < 3$, $y < 4$ and odd |

TABLE 4-continued

| | |
|---|---|
| $\alpha_{5,1,3(x-3)+1,2y}^{0,2,x,y} = 1$ | for $3 <= x < 6$, and $y < 4$ and even |
| $\alpha_{5,1,3(x-3)+1,2y-1}^{0,2,x,y} = \frac{1}{2}$ | for $3 <= x < 6$, and $y < 4$ and odd |
| $\alpha_{5,1,3(x-3)+1,2y+1}^{0,2,x,y} = \frac{1}{2}$ | for $3 <= x < 6$, and $y < 4$ and odd |
| $\alpha_{4,0,3(x-6)+2,2y}^{0,2,x,y} = 1$ | for $x >= 6$, and $y < 4$ and even |
| $\alpha_{4,0,3(x-6)+2,2y-1}^{0,2,x,y} = \frac{1}{2}$ | for $x >= 6$, and $y < 4$ and odd |
| $\alpha_{4,0,3(x-6)+2,2y+1}^{0,2,x,y} = \frac{1}{2}$ | for $x >= 6$, and $y < 4$ and odd |
| $\alpha_{5,2,3x,2(y-4)}^{0,2,x,y} = 1$ | for $x < 3$, $y >= 4$ and even |
| $\alpha_{5,2,3x,2(y-4)-1}^{0,2,x,y} = \frac{1}{2}$ | for $x < 3$, $y >= 4$ and odd |
| $\alpha_{5,2,3x,2(y-4)+1}^{0,2,x,y} = \frac{1}{2}$ | for $x < 3$, $y >= 4$ and odd |
| $\alpha_{3,3,3(x-3)+1,2(y-4)}^{0,2,x,y} = 1$ | for $3 <= x < 6$, and $y >= 4$ and even |
| $\alpha_{3,3,3(x-3)+1,2(y-4)-1}^{0,2,x,y} = \frac{1}{2}$ | for $3 <= x < 6$, and $y >= 4$ and odd |
| $\alpha_{3,3,3(x-3)+1,2(y-4)+1}^{0,2,x,y} = \frac{1}{2}$ | for $3 <= x < 6$, and $y >= 4$ and odd |
| $\alpha_{4,2,3(x-6)+2,2(y-4)}^{0,2,x,y} = 1$ | for $x >= 6$, and $y >= 4$ and even |
| $\alpha_{4,2,3(x-6)+2,2(y-4)-1}^{0,2,x,y} = \frac{1}{2}$ | for $x >= 6$, and $y >= 4$ and odd |
| $\alpha_{4,2,3(x-6)+2,2(y-4)+1}^{0,2,x,y} = \frac{1}{2}$ | for $x >= 6$, and $y >= 4$ and odd |

TABLE 5

| | |
|---|---|
| $\alpha_{4,1,3x,2y}^{0,3,x,y} = 1$ | for $x < 3$, $y < 4$ and even |
| $\alpha_{4,1,3x,2y-1}^{0,3,x,y} = \frac{1}{2}$ | for $x < 3$, $y < 4$ and odd |
| $\alpha_{4,1,3x,2y+1}^{0,3,x,y} = \frac{1}{2}$ | for $x < 3$, $y < 4$ and odd |
| $\alpha_{5,0,3(x-3)+1,2y}^{0,3,x,y} = 1$ | for $3 <= x < 6$, and $y < 4$ and even |
| $\alpha_{5,0,3(x-3)+1,2y-1}^{0,3,x,y} = \frac{1}{2}$ | for $3 <= x < 6$, and $y < 4$ and odd |
| $\alpha_{5,0,3(x-3)+1,2y+1}^{0,3,x,y} = \frac{1}{2}$ | for $3 <= x < 6$, and $y < 4$ and odd |
| $\alpha_{5,1,3(x-6)+2,2y}^{0,3,x,y} = 1$ | for $x >= 6$, and $y < 4$ and even |
| $\alpha_{5,1,3(x-6)+2,2y-1}^{0,3,x,y} = \frac{1}{2}$ | for $x >= 6$, and $y < 4$ and odd |
| $\alpha_{5,1,3(x-6)+2,2y+1}^{0,3,x,y} = \frac{1}{2}$ | for $x >= 6$, and $y < 4$ and odd |
| $\alpha_{4,2,3x,2(y-4)}^{0,3,x,y} = 1$ | for $x < 3$, $y >= 4$ and even |
| $\alpha_{4,2,3x,2(y-4)-1}^{0,3,x,y} = \frac{1}{2}$ | for $x < 3$, $y >= 4$ and odd |

TABLE 5-continued

| | |
|---|---|
| $\alpha^{0,3,x,y}_{2,2,3x,2(y-4)+1} = \frac{1}{2}$ | for $x < 3$, $y \geq 4$ and odd |
| $\alpha^{0,3,x,y}_{2,2,3(x-3)+1,2(y-4)} = 1$ | for $3 \leq x < 6$, and $y \geq 4$ and even |
| $\alpha^{0,3,x,y}_{2,2,3(x-3)+1,2(y-4)-1} = \frac{1}{2}$ | for $3 \leq x < 6$, and $y \geq 4$ and odd |
| $\alpha^{0,3,x,y}_{2,2,3(x-3)+1,2(y-4)+1} = \frac{1}{2}$ | for $3 \leq x < 6$, and $y \geq 4$ and odd |
| $\alpha^{0,3,x,y}_{3,3,3(x-6)+2,2(y-4)} = 1$ | for $x \geq 6$, and $y \geq 4$ and even |
| $\alpha^{0,3,x,y}_{3,3,3(x-6)+2,2(y-4)-1} = \frac{1}{2}$ | for $x \geq 6$, and $y \geq 4$ and odd |
| $\alpha^{0,3,x,y}_{3,3,3(x-6)+2,2(y-4)+1} = \frac{1}{2}$ | for $x \geq 6$, and $y \geq 4$ and odd |

TABLE 6

| | |
|---|---|
| $\alpha^{0,4,x,y}_{0,4,3x,2y} = 1$ | for $x < 3$, $y < 4$ and even |
| $\alpha^{0,4,x,y}_{0,4,3x,2y-1} = \frac{1}{2}$ | for $x < 3$, $y < 4$ and odd |
| $\alpha^{0,4,x,y}_{0,4,3x,2y+1} = \frac{1}{2}$ | for $x < 3$, $y < 4$ and odd |
| $\alpha^{0,4,x,y}_{1,4,3(x-3)+1,2y} = 1$ | for $3 \leq x < 6$, $y < 4$ and even |
| $\alpha^{0,4,x,y}_{1,4,3(x-3)+1,2y-1} = \frac{1}{2}$ | for $3 \leq x < 6$, $y < 4$ and odd |
| $\alpha^{0,4,x,y}_{1,4,3(x-3)+1,2y+1} = \frac{1}{2}$ | for $3 \leq x < 6$, $y < 4$ and odd |
| $\alpha^{0,4,x,y}_{2,4,3(x-6)+2,2y} = 1$ | for $x \geq 6$, $y < 4$ and even |
| $\alpha^{0,4,x,y}_{2,4,3(x-6)+2,2y-1} = \frac{1}{2}$ | for $x \geq 6$, $y < 4$ and odd |
| $\alpha^{0,4,x,y}_{2,4,3(x-6)+2,2y+1} = \frac{1}{2}$ | for $x \geq 6$, $y < 4$ and odd |
| $\alpha^{0,4,x,y}_{3,4,3x,2(y-4)} = 1$ | for $x < 3$, $y \geq 4$ and even |
| $\alpha^{0,4,x,y}_{3,4,3x,2(y-4)-1} = \frac{1}{2}$ | for $x < 3$, $y \geq 4$ and odd |
| $\alpha^{0,4,x,y}_{3,4,3x,2(y-4)+1} = \frac{1}{2}$ | for $x < 3$, $y \geq 4$ and odd |
| $\alpha^{0,4,x,y}_{4,4,3(x-3)+1,2(y-4)} = 1$ | for $3 \leq x < 6$, and $y \geq 4$ and even |
| $\alpha^{0,4,x,y}_{4,4,3(x-3)+1,2(y-4)-1} = \frac{1}{2}$ | for $3 \leq x < 6$, and $y \geq 4$ and odd |
| $\alpha^{0,4,x,y}_{4,4,3(x-3)+1,2(y-4)+1} = \frac{1}{2}$ | for $3 \leq x < 6$, and $y \geq 4$ and odd |
| $\alpha^{0,4,x,y}_{5,4,3(x-6)+2,2(y-4)} = 1$ | for $x \geq 6$, and $y \geq 4$ and even |
| $\alpha^{0,4,x,y}_{5,4,3(x-6)+2,2(y-4)-1} = \frac{1}{2}$ | for $x \geq 6$, and $y \geq 4$ and odd |
| $\alpha^{0,4,x,y}_{5,4,3(x-6)+2,2(y-4)+1} = \frac{1}{2}$ | for $x \geq 6$, and $y \geq 4$ and odd |

TABLE 7

| | |
|---|---|
| $\alpha^{0,5,x,y}_{0,5,3x,2y} = 1$ | for $x < 3$, $y < 4$ and even |
| $\alpha^{0,5,x,y}_{0,5,3x,2y-1} = \frac{1}{2}$ | for $x < 3$, $y < 4$ and odd |
| $\alpha^{0,5,x,y}_{0,5,3x,2y+1} = \frac{1}{2}$ | for $x < 3$, $y < 4$ and odd |
| $\alpha^{0,5,x,y}_{1,5,3(x-3)+1,2y-1} = 1$ | for $3 \leq x < 6$, and $y < 4$ and even |
| $\alpha^{0,5,x,y}_{1,5,3(x-3)+1,2y-1} = \frac{1}{2}$ | for $3 \leq x < 6$, and $y < 4$ and odd |
| $\alpha^{0,5,x,y}_{1,5,3(x-3)+1,2y+1} = \frac{1}{2}$ | for $3 \leq x < 6$, and $y < 4$ and odd |
| $\alpha^{0,5,x,y}_{2,5,3(x-6)+2,2y} = 1$ | for $x \geq 6$, and $y < 4$ and even |
| $\alpha^{0,5,x,y}_{2,5,3(x-6)+2,2y-1} = \frac{1}{2}$ | for $x \geq 6$, and $y < 4$ and odd |
| $\alpha^{0,5,x,y}_{2,5,3(x-6)+2,2y+1} = \frac{1}{2}$ | for $x \geq 6$, and $y < 4$ and odd |
| $\alpha^{0,5,x,y}_{3,5,3x,2(y-4)} = 1$ | for $x < 3$, and $y \geq 4$ and even |
| $\alpha^{0,5,x,y}_{3,5,3x,2(y-4)-1} = \frac{1}{2}$ | for $x < 3$, $y \geq 4$ and odd |
| $\alpha^{0,5,x,y}_{3,5,3x,2(y-4)+1} = \frac{1}{2}$ | for $x < 3$, $y \geq 4$ and odd |
| $\alpha^{0,5,x,y}_{4,5,3(x-3)+1,2(y-4)} = 1$ | for $3 \leq x < 6$, and $y \geq 4$ and even |
| $\alpha^{0,5,x,y}_{4,5,3(x-3)+1,2(y-4)-1} = \frac{1}{2}$ | for $3 \leq x < 6$, and $y \geq 4$ and odd |
| $\alpha^{0,5,x,y}_{4,5,3(x-3)+1,2(y-4)+1} = \frac{1}{2}$ | for $3 \leq x < 6$, and $y \geq 4$ and odd |
| $\alpha^{0,5,x,y}_{5,5,3(x-6)+2,2(y-4)} = 1$ | for $x \geq 6$, and $y \geq 4$ and even |
| $\alpha^{0,5,x,y}_{5,5,3(x-6)+2,2(y-4)-1} = \frac{1}{2}$ | for $x \geq 6$, and $y \geq 4$ and odd |
| $\alpha^{0,5,x,y}_{5,5,3(x-6)+2,2(y-4)+1} = \frac{1}{2}$ | for $x \geq 6$, and $y \geq 4$ and odd |

Figure 11:
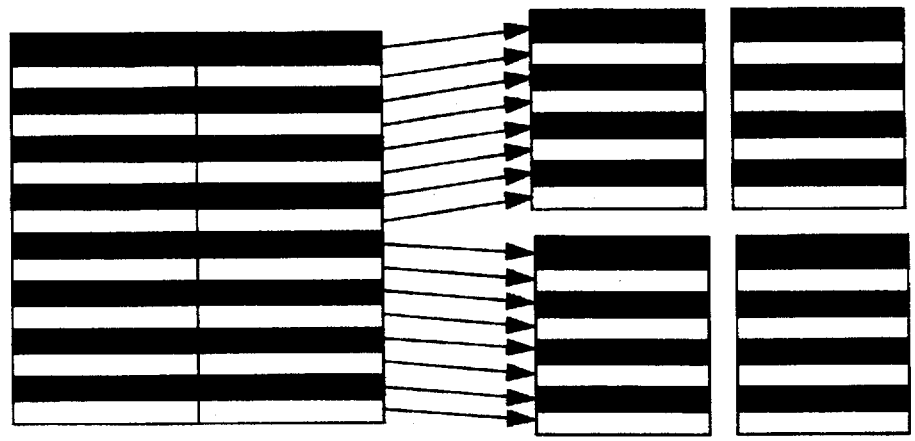
FIGS. 11(a) and 11(b) are data structure diagrams which illustrate the luminance macroblock structure in frame DCT coding and the luminance macroblock structure in field DCT coding for a 4:2:0 block format.
Figure 11:
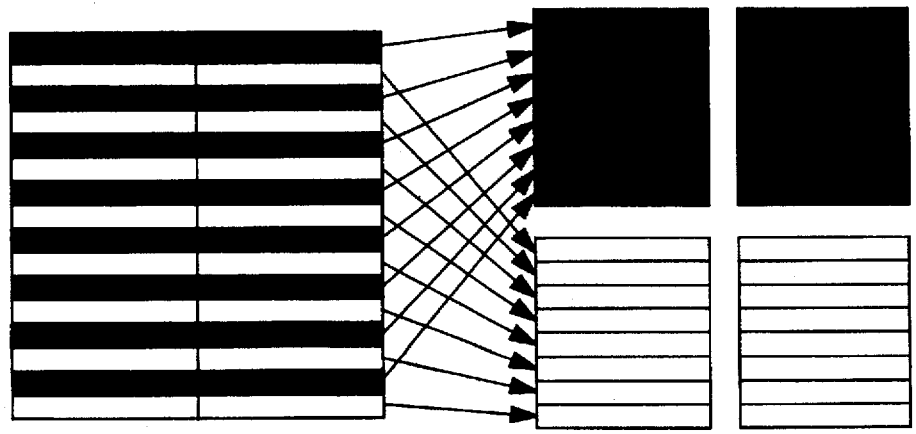

The pre-computed values PCV calculated from the values α in Tables 2 to 7 are for a frame to frame DCT conversion of the DCT coefficient values. FIGS. 11(a) and 11(b) illustrate the luminance macroblock structure in frame DCT coding and the luminance macroblock structure in field DCT coding, respectively, for a 4:2:0 block format. In a frame coded macroblock, each block, b0–b3, is composed of two fields alternatively. In a field coded macroblock, each block, b0–b3, is composed of lines from one of two fields. The chrominance macroblocks for each format are organized in frame format. The pre-computed values are for converting a set of frame coded macroblocks to a single frame coded macroblock. Pre-computed values could also be provided for converting a set of field coded macroblocks to a single field coded macroblock. It is advantageous to provide pre-computed values for one type, frame to frame or field to field, conversion to reduce the size of the memory used to store the coefficients.

Alternatively, the pre-computed values PCV can be calculated from the values α by DCT converter 140. Table 8 below is pseudo code for calculating the precomputed values from the values α.

TABLE 8

```
if x < = N-1 then
   y = 0
   if y < = N-1 then
      m = 0
      if m < = N-1 then
         n = 0
         if n < = N-1 then
```

$$TMP = \alpha[i][j][m][n] \ TMP = \alpha[i][j][m][n] \cdot \cos\frac{(2x+1)\mu\pi}{2N} \cdot \cos\frac{(2y+1)v\pi}{2N} \cdot$$

$$\cos\frac{(2m+1)\mu'\pi}{2N} \cdot \cos\frac{(2n+1)v'\pi}{2N}$$

```
            PCV = PCV + TMP
            n = n+1
            goto 40
         else m = m + 1; goto 30
      else y = y + 1; goto 20
   else x = x + 1
else end
```

In this alternative embodiment, the values α are stored in memory 40. The values α are retrieved from memory 40 and the pre-computed values PCV are calculated by converter 140 using the pseudo code in Table 8.

Next, at step 460, a temporary value ftemp is calculated by adding the previous temporary value Ftemp to the retrieved original DCT coefficient value multiplied by the pre-computed value PCV. Since converted coefficient values $F_{ij}(u,v)$ can be generated from a number of original coefficient values $F'_{i'j'}(u',v')$, it is next determined, at step 470, if any more original coefficient values $F'_{i'j'}(u',v')$ are required to produce the selected converted coefficient value $F_{ij}(u,v)$. If additional original coefficient values $F'_{i'j'}(u',v')$ are required, step 420 is repeated. Otherwise, at step 480, the converted coefficient value $F_{ij}(u,v)$ is set equal to the value Ftemp. Then, at step 490, it is determined if any more converted coefficient values $F_{ij}(u,v)$ of the converted macroblock are to be produced. If more converted coefficient values $F_{ij}(u,v)$ are to be produced, then, step 410 is repeated.

As a result, converted DCT coefficient values $F_{ij}(u,v)$ can be generated from original DCT coefficient values $F'_{i'j'}(u',v')$ in the spatial frequency domain rapidly and without converting the DCT coefficient values to pixels values.

Although the above exemplary embodiment of the present invention discusses the use of direct DCT mapping to effectively decimate or interpolate an MPEG coded signal, direct mapping of coefficient values can be applied to any system which requires the decimation or interpolation of a signal in the pixel domain by directly mapping the signal represented by transform coefficients in the spatial frequency domain.

Figure 6:
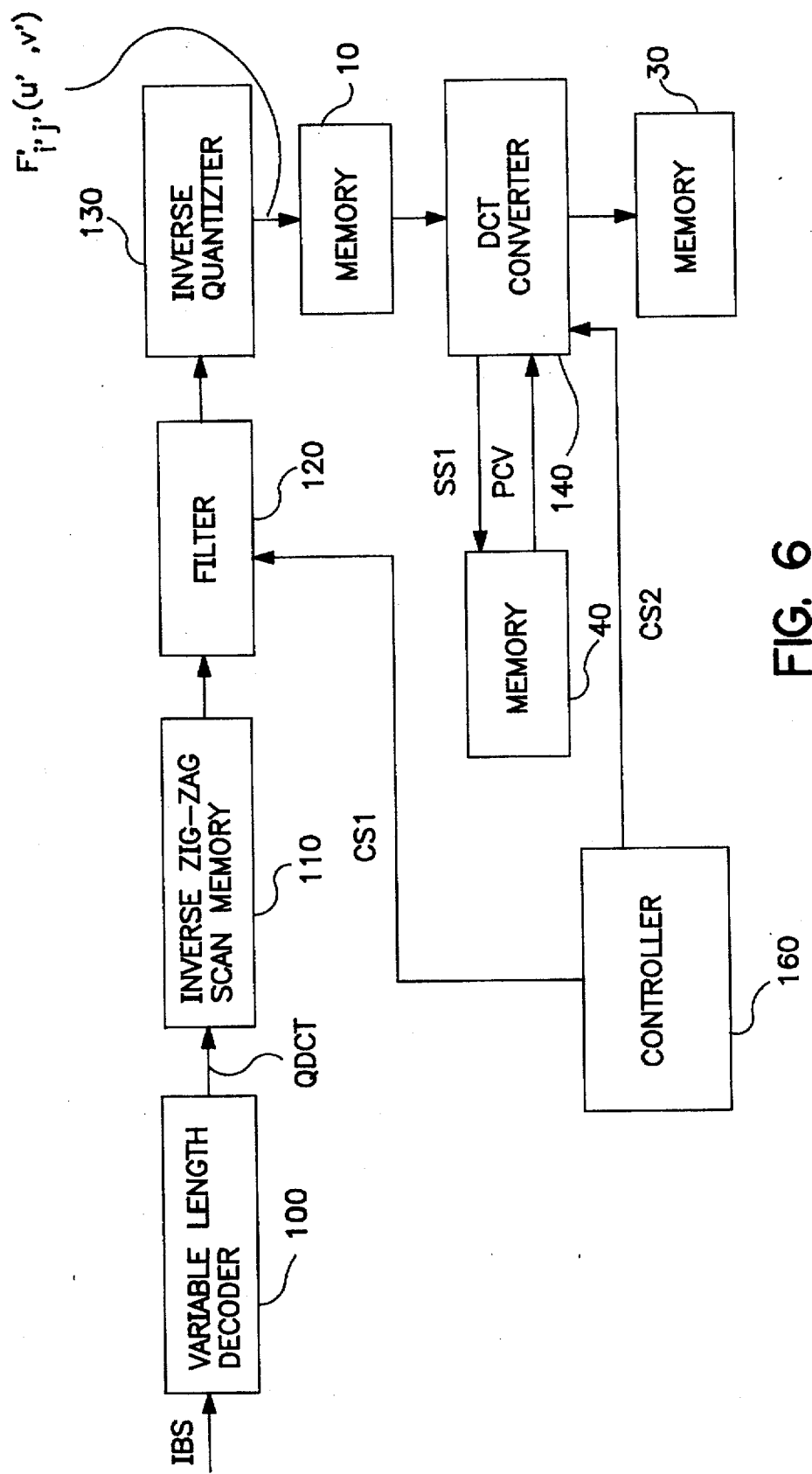
FIG. 6 is a block diagram of a decoder apparatus in accordance with an exemplary embodiment of the present invention.

FIG. 6 illustrates the overall organization of a decoder including the DCT converter 140 which maps original DCT coefficient values $F'_{i'j'}(u',v')$ to converted DCT coefficient values $F_{ij}(u,v)$ in accordance with another exemplary embodiment of the present invention. As shown in FIG. 6, an input bit-stream IBS is applied to variable length decoder (VLD) 100. The input bit-stream is, for example, a MP@HL encoded bit-stream. VLD 100 decodes the input bit stream IBS to generate blocks of quantized discrete cosine transform (DCT) coefficient values QDCT. The quantized DCT coefficient values QDCT are provided to inverse zig-zag scan memory 110 which reorders the coefficient values.

The DCT coefficient values in the macroblocks are provided one value at a time in formats specified by the above referenced MPEG-2 specification. FIGS. 5(a) and 5(b) illustrate the two different zig-zag scan patterns: pattern 0 and pattern 1, used in the MPEG-2 specification. In the inverse zig-zag scan memory 110, the type of scan pattern is detected and the DCT coefficient values are rearranged as shown in FIG. 5(c).

Next, the DCT coefficient values are provided to filter 120. Filter 120 is a low pass filter which diagonally truncates the macroblocks to eliminate the high frequency components of the image when the image resolution is to be reduced. Controller 160 provides a control signal CS1 to enable or disable filter 120. Filter 120 is used to prevent aliasing. Filter 120 does not filter the macroblocks when a higher resolution image is produced from a lower resolution image.

The DCT coefficient values are then dequantized in inverse quantizer 130. The dequantized coefficient values, which are the original DCT coefficient values $F'_{i'j'}(u',v')$, are stored in memory 10. Memory 10, DCT converter 140, and memories 30 and 40 operate as described above in the first exemplary embodiment. Controller 160 provides control signal CS2 to DCT converter 140. Control signal CS2 is the same as the control signal CS2 described above in the first exemplary embodiment.

Figure 7:
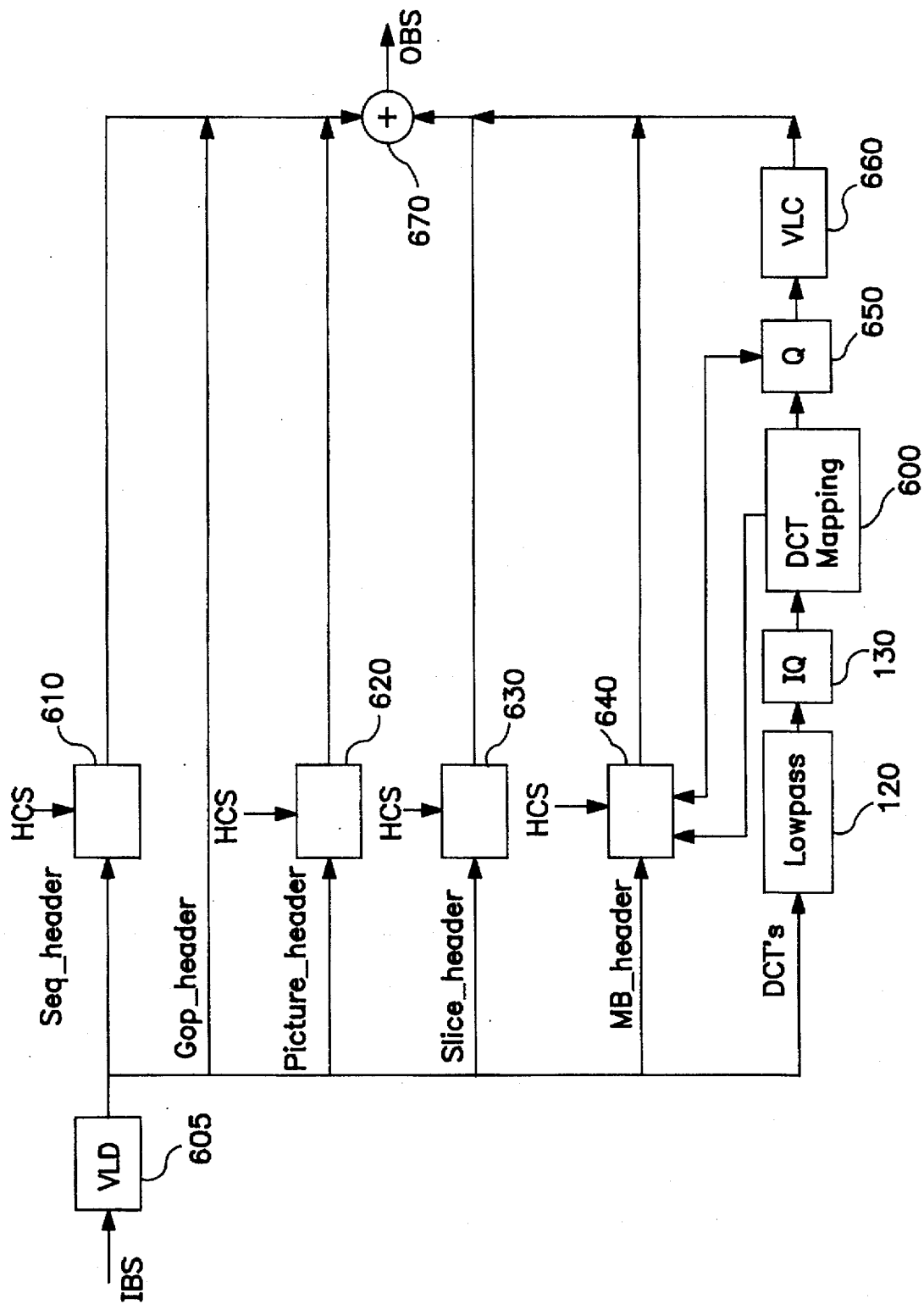
FIG. 7 is a block diagram of another exemplary embodiment of the present invention directed to an MPEG-2 bit stream down conversion circuit.

FIG. 7 is another exemplary embodiment of the present invention directed to MPEG-2 bit stream down conversion circuitry. In this embodiment, in addition to changing the resolution of the image by DCT mapping, new header information and motion vectors are produced for resulting images. In the exemplary embodiment shown in FIG. 7, the original motion vectors are scaled and a suitable motion vector is generated from the macroblocks in the original image to produce motion vectors for the new macroblocks in the different resolution image.

The basic syntax of the MPEG-2 Main Profile defines the compressed MPEG-2 bit stream as a sequence of images in five layers, the sequence layer, the group pictures layer, the picture layer, the slice layer, and the macroblock layer. Each of these layers is introduced with control information: the sequence header, SH, for the sequence layer, the group of pictures header, GOPH, for the group of pictures layer, the picture header, PH, for the picture layer, the slice header, SLH, for the slice layer, and the macroblock layer header, MBH, for the macroblock layer. Finally, other control information, also known as side information, (e.g. frame type, macroblock pattern, image motion vectors, coefficient zig-zag patterns and dequantization information) are interspersed throughout the coded bit stream.

As shown in FIG. 7, an input bit-stream IBS containing the layers and control information is applied to variable length decoder (VLD) 605. The input bit-stream is, for example, a MP@HL encoded bit-stream. VLD 605 decodes the input bit stream IBS to generate blocks of quantized discrete cosine transform (DCT) coefficient values. In addition, VLD 605 reorders the quantized coefficients values by performing an inverse zig-zag scan. The quantized DCT coefficient values QDCT are provided to filter 120. VLD 605 also provides the sequence header SH to a first converter 610, the group of pictures header GOPH to a combiner 670, the picture header PH to the second converter 620, the slice header SLH to third converter 630, and the macroblock layer header MBH to the fourth converter 640.

The first, second, and third converters 610, 620, and 630 make minor, mostly fixed value changes to the sequence header SH, the group of pictures header GOPH, the picture header PH, and the slice header SLH, respectively, is response to the change of resolution. Table 9 below provides exemplary pseudo code for changing the header information as a result of the conversion.

TABLE 9

```
slice() {
        /* slice header processing here : no
                change */
        slice_start_code
        if (vertical_size > 2800)
                slice_vertical_position_extension
        if ( <sequence_scalable_extension() is
                present in the bit stream>) {
                if (scalable_mode == "data partioning")
        priority_breakpoint
        }
        quantizer_scale_code
        if (nextbits() == '1') {
                intra_slice_flag
                intra_slice
                reserved_bits
                while (nextbits() == '1') {
                        extra_bit_slice /*with the value 0*/
                        extra_information slice
                }
        }
        extra_bit slice       /* with the value 1 */
        slice_modulo = slice_no % M;
        if (slice_modulo != M-1) {
                do {
                        macroblock();
                        inverse_quantize();
                        inverse_DCT();
                        save_MB_information_slice(slice_modulo,
                                mb);
                } while ( nextbits != '000 0000 0000 0000
                                                0000 0000 0000');
        }
        else { /* last of M slices */
                do {
                        macroblock();
                        inverse_quantize();
                        inverse_dct();
                        mb_modulo = mb % N;
                        save_MB_information_MB(mb_modulo);
                        if (mb_modulo == N-1) {
                                encode_output ();
                        }
                } while ( nextbits != '000 0000 0000 0000
                                                0000 0000'
        }
        next_start_code();
}
                /*where, mb = macroblock
                        number counting from start
                        of slice,*/
        save_MB_information_slice(slice_modulo, mb) {
```

TABLE 9-continued

```
        save macroblock informations at slice_modulo
        and mb.
                There are (M-1) slices of macroblock
                                information.
        }
                /*
                where,
                macroblock information = {
                        macroblock_modes = {macroblock
                                type,
                                frame/file motion
                                type, dct_type},
                        quandtizer_scale,
                        motion_vectors,
                        coded block pattern,
                        DCT coefficients
                } */
        save_MB_information_MB(mb_modulo) {
                save macroblock information at mb_modulo.
                There are N Macroblock information.
        }
```

The sequence header SH, the group of pictures header GOPH, the picture header PH, and the slice header SLH are modified in response to the size conversion factor specified for the image represented by the input bit stream IBS. The format of these headers are specified in the above referenced MPEG-2 standard at sections 6.2 and 6.3. Converters 610–640 modify the headers SH, GOPH, PH, and SLH in response to header control signal HCS which specifies the change from the input image resolution to the output image resolution.

The motion vectors provided with the macroblocks in the original image generally require modification after decimation or interpolation of the macroblocks since a large amount of processing is performed to produce the image with a different resolution. Whether a macroblock has a motion vector depends upon whether the macroblock is intra coded or non-intra coded. A macroblock is intra coded (I-coded) if it is coded using only information from a single frame. A macroblock is non-intra coded if it is coded using motion compensated prediction from past reference fields or frames (P-coded) or coded using motion compensated prediction from past and/or future reference fields or frames (B-coded).

As described above with reference to FIG. 1, the original DCT coefficient values $F'_{ij}(u',v')$ are dequantized by inverse quantizer 130 and then mapped to converted DCT coefficient values $F_{ij}(u,v)$ by DCT converter 140. DCT converter 600 operates the same as DCT converter 140 to convert original DCT coefficient values to converted DCT coefficient values. DCT converter 600 also performs additional operations described below. Further, DCT converter 600 includes memories for storing the pre-computed values PCV, original DCT coefficients, and converted DCT coefficients.

The original DCT coefficient values are provided to DCT converter 600 to generate the converted macroblock CMB. In the examplary embodiment of the invention, a region defined by two macroblocks vertically and three macroblocks horizontally of a coded input image having a resolution from 1920 by 1024 are used to produce a single macroblock of 640 by 540 of a coded output image. A portion of the input image corresponding to the entire width of the picture is stored. This portion of the image includes one or more slices. A slice is a consecutive series of macroblocks which represent a group of sixteen consecutive horizontal lines of the image. For example, for a MP@HL encoded signal, 240 consecutive macroblocks in one row correspond to an entire row of an image.

Figure 10:
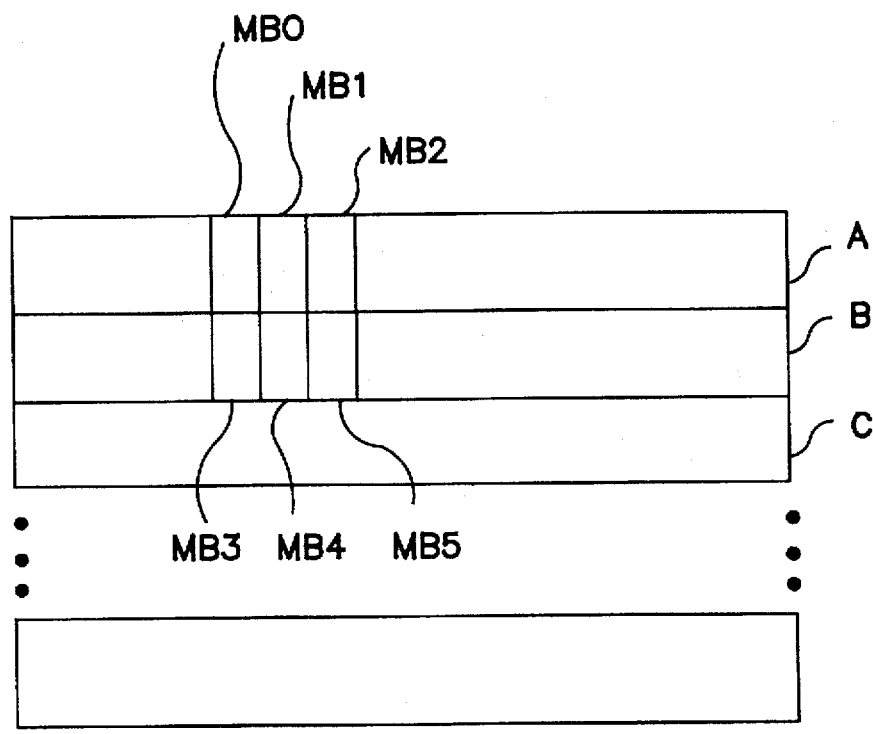
FIG. 10 is a data structure diagram illustrating the organization of macroblocks in a slice.

For example, macroblocks MB0–MB2 and MB3–MB5 from FIG. 3(a) are shown in FIG. 10 contained in slices A and B, respectively. As the converted macroblocks are generated, macroblocks MB0–MB2 in slice A are stored in the memory (not shown) of DCT converter 600. Macroblocks MB3–MB5 in slice B are provided to and stored in the memory and used in combination with macroblocks MB0–MB2 which have been retrieved from the memory to generate the converted macroblock CMB shown in FIG. 3(c).

In addition to generating the converted DCT coefficient values $F_{ij}(u,v)$ in the converted macroblock CMB, DCT converter 600 also processes the macroblocks in response to the motion parameters of the macroblock. The operation of the circuitry for processing the macroblocks to generate motion parameters for the converted macroblocks is explained in greater detail below with reference to FIG. 8.

Figure 8:
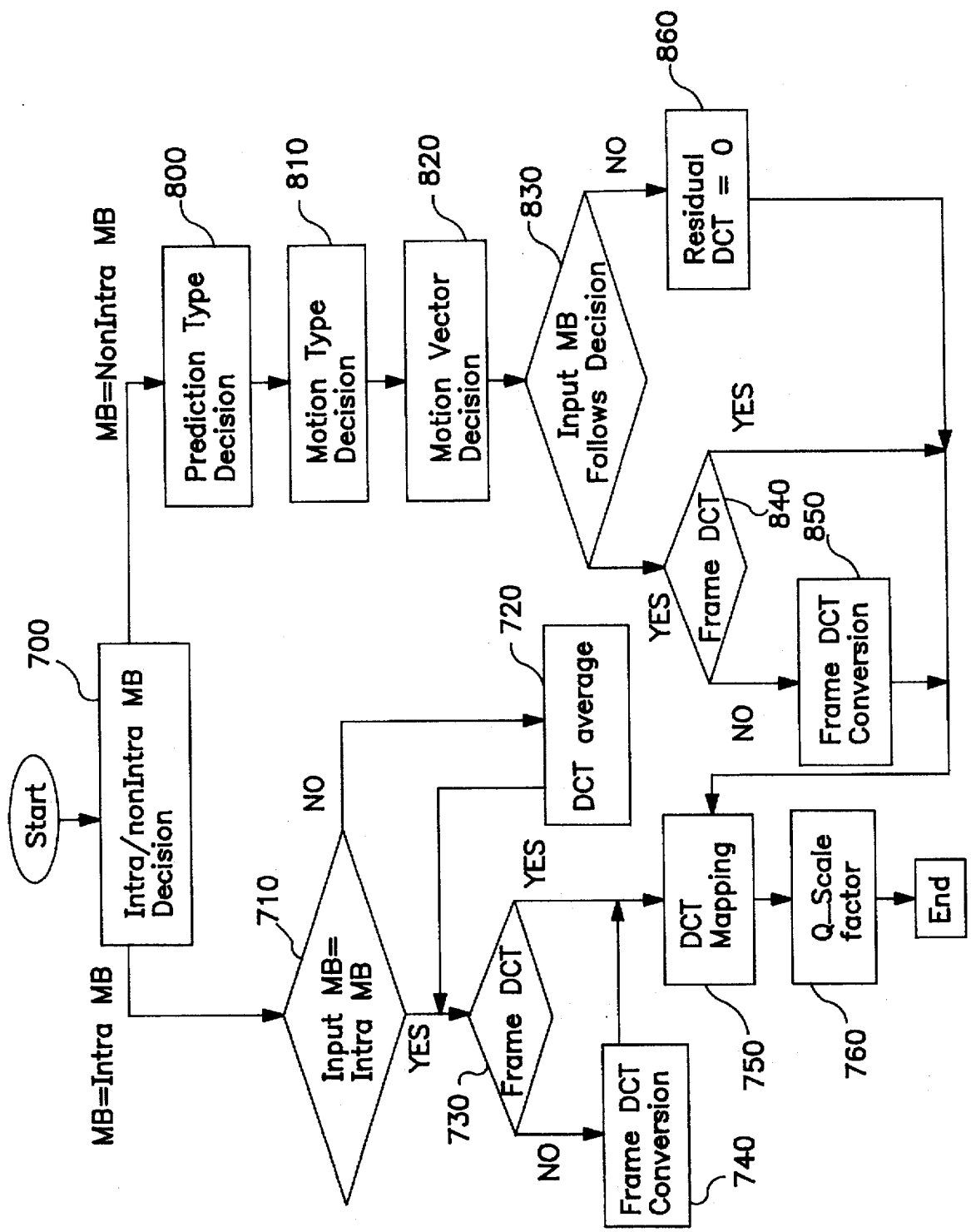
FIG. 8 is a flow chart illustrating the operation of the MPEG-2 bit stream down conversion circuit shown in FIG. 7.

As shown in FIG. 8, at step 700, the DCT converter 600 determines whether the macroblock is to be a non-intra or intra coded macroblock. As shown in the example of FIG. 4, six macroblocks MB0–MB5 are converted to one macroblock CMB. In other words, the resolution of the picture containing the six macroblocks MB0–MB5 is changed from 1920 by 640 pixels per frame to 640 by 540 pixels per frame. Further, each of the six macroblocks MB0–MB5 can be either non-intra coded or intra coded. Therefore, it is necessary to determine whether the converted macroblock is to be non-intra coded or intra coded based on the original six macroblocks MB0–MB5. DCT converter 600 employs a majority rule using the original macroblock MB0–MB6 to determine if the converted macroblock is non-intra coded or intra coded.

With reference to FIG. 3(a), for example, if four of the original macroblocks MB0, MB1, MB2, and MB4 are non-intra coded and two of the original macroblocks MB3 and MB5 are intra coded, then the converted macroblock is non-intra coded. Alternatively, if four of the original macroblocks MB0, MB1, MB2, and MB5 are intra coded and two of the original macroblocks MB3 and MB5 are non-intra coded, then the converted macroblock is intra coded. If three of the original macroblocks MB0, MB1, and MB4 are non-intra coded and three of the original macroblocks MB2, MB3 and MB5 are intra coded, the inventor has determined that the code type of the converted macroblock is non-intra coded.

Returning to FIG. 8, if the converted macroblock CMB is determined to be an intra coded macroblock at step 700, then, at step 710, it is determined which original macroblocks MB0–MB5 are intra coded and which are non-intra coded. The original DCT coefficient values in each of the original macroblocks which are non-intra coded, for example, macroblocks MB3 and MB5, are averaged to generate an average DCT coefficient value. Then, at step 720, each of the original DCT coefficient values $F'_{ij}(u',v')$ in the non-intra coded macroblocks are replaced with the average DCT coefficient value. For example, a DCT average value of the original DCT coefficient values $F'_{ij}(u',v')$ in macroblock MB3 is produced and each of the original DCT coefficient values $F'_{ij}(u',v')$ in macroblock MB3 are replaced with the average DCT value. After step 720, or after step 710, step 730 is executed.

At step 730, it is determined whether the macroblocks MB0–MB5 are in field or frame format. At step 740, the format of the macroblock MB0–MB5 is converted to frame format if it is determined that the macroblock MB0–MB5 is in field format. The format of the macroblock is converted so that each of the macroblocks is processed in the same format. This simplifies the operation of the system. In an alternative embodiment, the macroblocks MB0–MB5 in frame format may be converted to field format and the macroblocks MB0–MB5 may be processed as described below in field format instead of frame format.

The appropriate steps 710, 720, 730, and 740 are performed for each of the original macroblocks MB0–MB5 used to produce the converted macroblock CMB. For example, original macroblock MB0 is in field format and intra coded. Thus, macroblock MB0 is processed in step 710 and, then, step 730. If the next macroblock MB1 is in field format and non-intra coded, then macroblock MB1 is processed through step 710, step 720, step 730 and step 740. Each of the other original macroblocks MB2–MB5 is processed appropriately depending upon the format and coding of each of the original macroblocks MB0–MB5.

Next, at step 750, the DCT coefficients in the original macroblocks MB0–MB5 are mapped into converted DCT coefficient values $F_{ij}(u,v)$. The mapping performed at step 750 is the same as the processing explained above with regard to FIGS. 2(a) and 2(b). At step 760, a quantized scale factor Q_scale is obtained for the converted macroblock based on the change in resolution of the image.

Returning to FIG. 7, the converted DCT coefficients $F_{ij}(u,v)$ provided by the DCT converter 600 are quantized by quantizer 650 using the quantized scale factor Q_scale produced by DCT converter 600. The quantized scale factor Q_scale determined at step 760, shown in FIG. 8, and the coding type of the converted macroblock CMB determined at step 700, shown in FIG. 8, are provided to fourth converter 640. The macroblock header MB is then modified by fourth converter 640 using the coding type of the converted macroblock and the quantization scale factor Q_scale. Finally, the quantized converted DCT coefficients are variable length encoded.

Figure 9A:
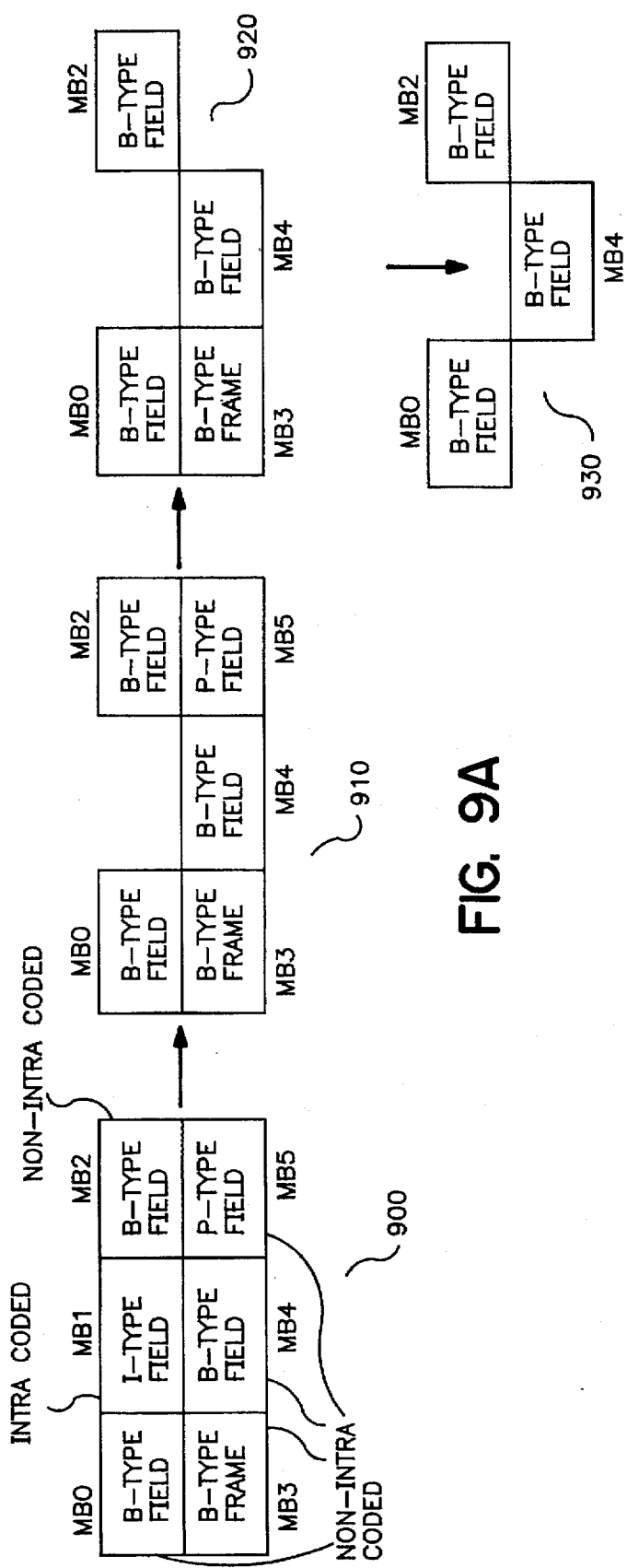
FIGS. 9(a) and 9(b) are data structure diagrams illustrating the operation of steps 700, 800, 810, and 820 shown in FIG. 7.
Figure 9B:
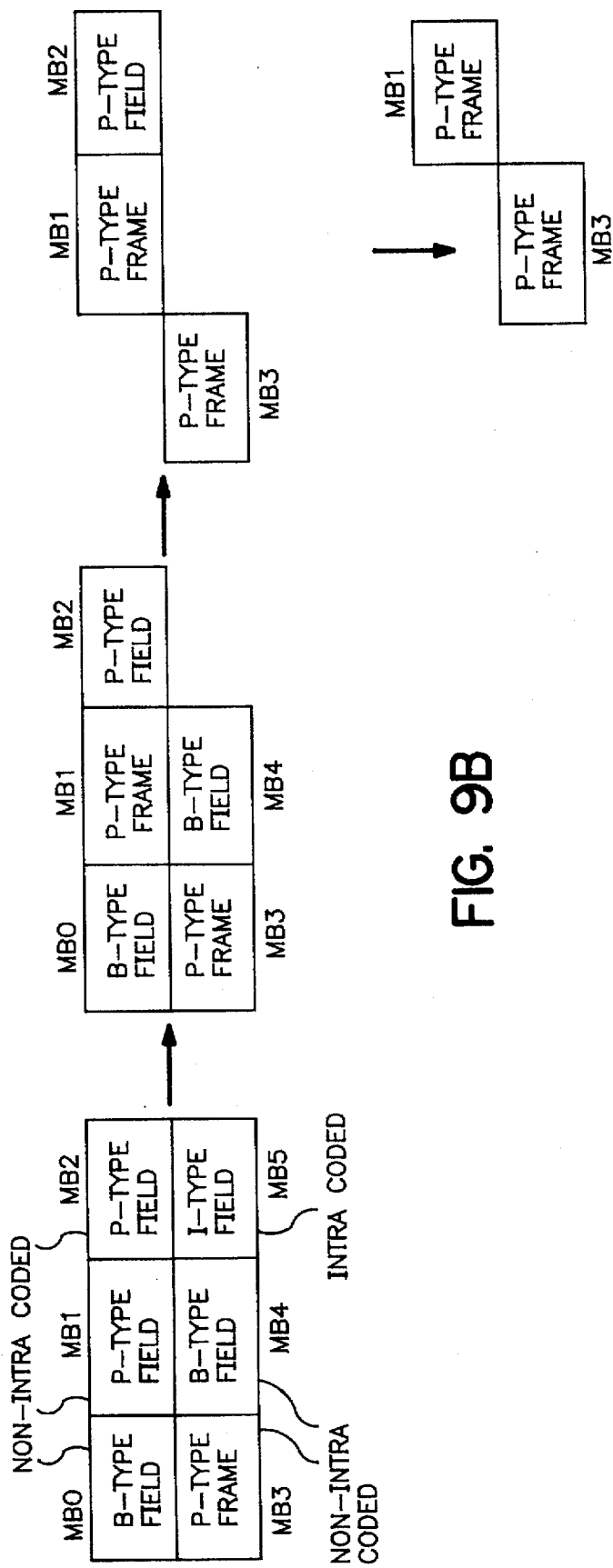

Alternatively, if it is determined at step 700, shown in FIG. 8, that the converted macroblocks is to be non-intra coded, then, the original macroblocks MB0–MB5 are processed at steps 700, 800, 810, and 820 as shown in FIGS. 9(a) and 9(b). As illustrated in FIG. 9(a), for step 700, all of the macroblocks 900 are considered, as described above, to determine if the converted macroblock is intra coded. At step 800 shown in FIG. 8, the non-intra coding type of the converted macroblock is determined. At step 800, the P-type MB is dropped because the majority prediction type is B-type. As shown in FIG. 9(a), only the non-intra coded macroblocks 910 are used to determine the coding type. As described above with regard to step 700, majority rule is used to determine the coding type. In FIG. 9(a), the majority coding type is B-type, therefore, the converted macroblock CMB is coded B-type. Then, at step 810 shown in FIG. 8 and illustrated in FIG. 9(a), only the B-type macroblocks 920 are used to determine the motion decision type: field prediction or frame prediction. At step 810, one of the B-type blocks is dropped because it uses frame based prediction while the others use field based prediction.

In field prediction, predictions are made independently for each field using data from one or more previously decoded fields. Frame prediction forms a prediction for the frame from one or more previously decoded frames. Accordingly, field or frame prediction is selected for the converted macroblock CMB based on the field and frame format of the original macroblocks selected at step 800. Majority rule is used to select the field or frame prediction. As illustrated in FIG. 9(a), field prediction is selected at step 810 because original macroblocks MB0, MB2, and MB4 are in the majority and coded using field prediction. Finally, at step 820, the motion vector for the converted macroblock is selected using the remaining macroblocks 930. As in steps 800 and 810, shown in FIG. 8, majority rule is used to select the motion vector.

In the event that there is not a majority from which the prediction type can be determined, the prediction type is selected based on the following order of preference: bi-directional prediction, forward prediction, and backward prediction. For example, if only two macroblocks are remaining from which to select the prediction type, and one is bi-directionaly coded and the other is forward coded, then the selected prediction type is bi-directional for the converted macroblock.

In the event that there is not a majority from which the motion type can be determined, the selected motion type is frame type for the converted macroblock. In the event that there is not a majority from which the motion vector can be determined, the first motion vector of the first macroblock processed at step 820, shown in FIG. 8, becomes the selected motion vector for the converted macroblock CMB.

FIG. 9(b) is another data structure diagram illustrating the operation of steps 700, 800, 810, and 820 shown in FIG. 8 in response to different input macroblock MB0-MB5. In FIG. 9(b), the majority of macroblocks are non-intra coded. The non-intra coded macroblocks MB0-MB4 are used at step 800, shown in FIG. 8, to determine the prediction type: P-coded. Then, at step 810, shown in FIG. 8 and illustrated in FIG. 9(b), only the P-coded macroblocks MB1, MB2, and MB3 are used to determine the motion decision type: frame prediction. Finally, at step 820, the motion vector for the converted macroblock is selected using the frame prediction P-type macroblocks MB1 and MB3.

Next, at step 830 shown in FIG. 8, for each original macroblock MB0-MB5, it is determined if the original macroblocks MB0-MB5 have the same prediction type, motion type, and motion vector selected for the converted macroblock CMB. Each original macroblock MB0-MB5 which does not have the same prediction type, motion type and motion vector has its residual original coefficient values set equal to zero at step 860. Otherwise, it is next determined, at step 840 whether the original macroblock is in frame or field format. Then, at step 750, once the macroblock has been converted to frame at step 850, or if the macroblock is already in frame format, DCT mapping is performed at step 750 as described above.

When the resolution of the image is increased, the number of macroblocks is increased. In this case, the same method is used to select the intra/non-intra coding, the motion type, the prediction type, and the motion vector for the converted macroblocks. DCT coefficients for the converted macroblocks are also generated by directly mapping the DCT coefficients of the original macroblocks to increase the number of DCT coefficients.

Next, at step 760, a quantization scale Q_scale factor is produced by averaging the quantization scale factors of the original macroblocks MB0-MB5 which are used to generate the converted macroblock CMB. Quantizer 650, shown in FIG. 7, applies the quantization scale factor Q_scale factor to the converted DCT coefficients to produce quantized DCT coefficients values QDCT'.

Next, converter four 640 shown in FIG. 7, generates a converted macroblock header for the converted quantized coefficients values QDCT'. The intra/non-intra macroblock type decision from step 700, the prediction type decision from step 800, the motion type decision from step 810, and the motion vector from step 820, each shown in FIG. 8, are provided to converter four 640 from DCT converter 600.

The Q_scale factor is provided from quantizer 650. As described above with reference to Table 9, converter four 640 uses the intra/non-intra macroblock type decision from step 700, the prediction type decision from step 800, the motion type decision from step 810, and the motion vector from step 820, each shown in FIG. 8, the change in resolution, and the quantization scale Q_scale, to produce the converted macroblock header.

As shown in FIG. 7, the sequence header SH, the group of picture header GOPH, the picture header PH, the slice header SLH, and the macroblock header MBH are combined with the variable length encoded signal from VLC 660 at combiner 670 to produce an output bit stream OBS. The output bit stream is, for example, a MPEG-2 MP@ML encoded signal.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. An apparatus for transforming the resolution of an image from a first resolution to a second resolution where a first plurality spatial frequency coefficient (SFC) values correspond to the image at the first resolution and a second plurality of SFC values correspond to the image at the second resolution, the apparatus comprising:

memory means for storing a plurality of pre-computed values where the pre-computed values determine the change in the resolution of the image from the first resolution to the second resolution; and converter means for directly converting the resolution of the image by mapping the first plurality of SFC values to the second plurality of SPC values in the spatial frequency domain, the converter means including:
  (a) means for combining the pre-computed values with the first plurality of SPC values to produce processed values; and
  (b) means for combining ones of the processed values to produce at least one of the second plurality of SFC values.

2. The apparatus according to claim 1, wherein the converter means further comprises:

means for multiplying one of the plurality of pre-computed values by one of the first plurality of SFC values;

means for multiplying another one of the plurality of pre-computed values by one of the first plurality of SFC values; and means for adding the multiplied values together to produce one of the second plurality of SPC values.

3. The apparatus according to claim 1, wherein the converter means comprises:

means for multiplying a first one of the plurality of pre-computed values by a first one of the first plurality of SFC values to produce a first intermediate value;

means for multiplying a second one of the plurality of pre-computed values by a second one of the first plurality of SFC values to produce a second intermediate value; and means for combining the first and second intermediate values to produce one of the second plurality of SFC values.

4. The apparatus according to claim 1, wherein the converter means retrieves the pre-computed values from the memory means.

5. The apparatus according to claim 1, wherein the first plurality of SFC values includes high frequency SFC values which correspond to high spatial frequency components in the image, and the apparatus further comprises filter means for eliminating the high spatial frequency components of the image by removing the high frequency SFC values.

6. The apparatus according to claim 1, wherein the pre-computed values represent a combination of conversion coefficients in the spatial frequency domain for converting the first plurality of SFC values which is equivalent to an interpolation of corresponding pixels in the pixel domain.

7. The apparatus according to claim 1, wherein the first plurality of SFC values and the second plurality of SFC values are Discrete Cosine Transform (DCT) coefficients.

8. The apparatus according to claim 7, wherein the first plurality of SFC values are arranged in blocks of macroblocks and the second plurality of SFC values are arranged in converted blocks of converted macroblocks, and one of the plurality of pre-computed values is used to map a z1-th DCT coefficient value of a j1-th block of an i1-th macroblock to a z-th SFC value of a j-th converted block of an i-th converted macroblock, where z1, j1, i1, z, j, and i are integers.

9. The apparatus according to claim 7, wherein the image at the first resolution is represented by an MPEG Main Profile, High Level signal which contains the first plurality of SFC values and the image at the second resolution is represented by an MPEG Main Profile, Main level signal which contains the second plurality of SFC values, and the converter means is further for converting the MPEG Main Profile, High Level signal to the MPEG Main Profile, Main level signal.

10. The apparatus according to claim 7, wherein the image at the first resolution is represented by an MPEG Main Profile, Main Level signal which contains the first plurality of SFC values and the image at the second resolution is represented by an MPEG Main Profile, High level signal which contains the second plurality of SFC values, and the converter means is further for converting the MPEG Main Profile, High Level signal to the MPEG Main Profile, Main level signal.

11. A decoder for decoding an MPEG encoded image and changing the resolution of the encoded image, the decoder comprising:

variable length decoding means for receiving and decoding an input signal containing DCT values, the DCT values defining a first resolution of the image;

inverse quantization means for dequantizing the DCT values; and memory means for storing a plurality of pre-computed values where the pre-computed values determine the change in a resolution of the encoded image from the first resolution to a second resolution; and converter means for directly converting the resolution of the encoded image by mapping the DCT coefficient values to a plurality of converted coefficient values in the spatial frequency domain, the converter means including:
  (a) means for combining the pre-computed values with the DCT coefficient values to produce processed values; and
  (b) means for combining the processed values to produce at least one of the plurality of converted coefficient values.

12. A method for transforming the resolution of an image from a first resolution to a second resolution where a first plurality spatial frequency coefficient (SFC) values correspond to the image at the first resolution and a second plurality of SFC values correspond to the image at the second resolution, the method comprising the steps of:
  (a) storing a plurality of pre-computed values where the pre-computed values determine the change in the resolution of the image from the first resolution to the second resolution; and
  (b) directly converting the resolution of the image by mapping the first plurality of SFC values to the second plurality of SFC values in the spatial frequency domain, step (b) comprising the steps of:
    applying the pre-computed values to the first plurality of SFC values to produce processed values; and
    combining ones of the processed values to produce at least one of the second plurality of SFC values.

13. The method according to claim 12, wherein step (b) comprises the steps of:
  multiplying a first one of the plurality of pre-computed values by a first one of the first plurality of SFC values to produce a first intermediate value;
  multiplying a second one of the plurality of pre-computed values by a second one of the first plurality of SFC values to produce a second intermediate value; and
  combining the first and second intermediate values to produce one of the second plurality of SFC values.

14. The method according to claim 12, wherein the first plurality of SFC values and the second plurality of SFC values are Discrete Cosine Transform coefficients.

15. The method according to claim 12, wherein the pre-computed values represent a combination of conversion coefficients in the spatial frequency domain for converting the first plurality of SFC values which is equivalent to an interpolation of corresponding pixels in the pixel domain.

* * * * *

UNITED STATES PATENT AND TRADEMARK OFFICE
CERTIFICATE OF CORRECTION

PATENT NO. : 5,737,019
DATED : 4/7/98
INVENTOR(S) : Hee-Yong Kim

Page 1 of 2

It is certified that error appears in the above-identified patent and that said Letters Patent is hereby corrected as shown below:

On the title page: Item [56]

add under U.S. Patent Documents heading "5,028,995   7/2/91   Izawa et al." to U.S. Patent Documents add "Foreign Patent Documents" heading add under Foreign Patent Documents heading "0 577 337 A2   1/5/94 European Patent Office"

add under Foreign Patent Documents heading "05068235   3/19/93 Japan (Abstract Only)"

add under Foreign Patent Documents heading "05316357   11/26/93 Japan (Abstract Only)"

UNITED STATES PATENT AND TRADEMARK OFFICE
CERTIFICATE OF CORRECTION

PATENT NO. : 5,737,019
DATED : 4/7/98
INVENTOR(S) : Hee-Yong Kim

It is certified that error appears in the above-identified patent and that said Letters Patent is hereby corrected as shown below:

, add under Other Publications heading "European Search Report   May 12, 1997"

In Column 22, lines 34, 37 and 52  "SFC" should be "SPC"

Signed and Sealed this

Second Day of February, 1999

Attest:

Attesting Officer

*Acting Commissioner of Patents and Trademarks*